United States Patent [19]

Ichihara et al.

[11] Patent Number: 5,230,316

[45] Date of Patent: Jul. 27, 1993

[54] METHOD AND APPARATUS FOR DETECTING KNOCK IN AN INTERNAL COMBUSTION ENGINE

[75] Inventors: Takanobu Ichihara, Katsuta; Kozo Katogi, Hitachi; Hiroatsu Tokuda, Katsuta, all of Japan

[73] Assignee: Hitachi, Ltd., Tokyo, Japan

[21] Appl. No.: 690,851

[22] Filed: Apr. 24, 1991

[30] Foreign Application Priority Data

Apr. 27, 1990 [JP] Japan ................... 2-110291
Jul. 6, 1990 [JP] Japan ................... 2-177422

[51] Int. Cl.$^5$ ............................................. F02P 5/14
[52] U.S. Cl. ................................................. 123/425
[58] Field of Search ................. 123/425, 479, 435; 364/431.05; 73/35

[56] References Cited

U.S. PATENT DOCUMENTS

| | | | |
|---|---|---|---|
| 4,466,406 | 8/1984 | Hartung | 123/425 |
| 5,005,549 | 4/1991 | Pannpaindras et al. | 123/479 |
| 5,012,782 | 5/1991 | Tokuda | 123/425 |
| 5,040,510 | 8/1991 | Krabs et al. | 123/425 |
| 5,083,278 | 1/1992 | Matsuura | 364/431.08 |
| 5,088,044 | 2/1992 | Matsuura | 364/431.08 |

FOREIGN PATENT DOCUMENTS 2571141 4/1986 France .................. 123/425

OTHER PUBLICATIONS

Patents Abstracts of Japan, vol. 7, No. 117 (P-198)(1262) May 21, 1983 and JP-A-58 037 531 (matsushita) Mar. 4, 1983.
Patents Abstracts of Japan, vol. 8, No. 183 (P-296)(1620) Aug. 23, 1984 and JP-A-59 073 750 (Matsushita) Apr. 26, 1984.

*Primary Examiner*—Raymond A. Nelli
*Attorney, Agent, or Firm*—Ladas & Parry

[57] ABSTRACT

A method and apparatus of detecting knocking in an internal combustion engine having a crankshaft uses a knock detecting sensor to detect vibration caused by knocking. The signals from the knock detecting sensor are detected between a first and a second moment of time (i.e. a measurement window) and at least one of the first and second moments of time are independently varied in dependence upon a vibration spectrum of frequencies to be detected. In a preferred embodiment a plurality of frequency spectra, each having a different first and second moment of time, are each separately analyzed for determining knock intensity. The moments of time are represented by first and second angles of the crankshaft. A plurality of measurement windows are advantageously used to determine the level of knocking and if the level exceeds a predetermined level the ignition timing for the engine is retarded. The frequency of maximum amplitude is arranged in operation to be the center frequency of a frequency spectrum determined by the measurement window.

24 Claims, 21 Drawing Sheets

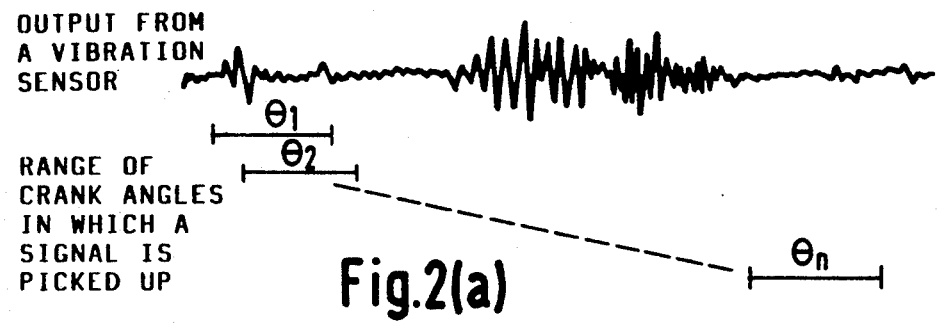
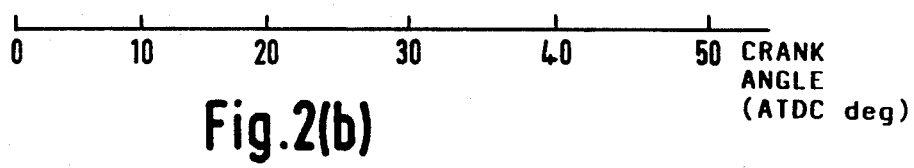
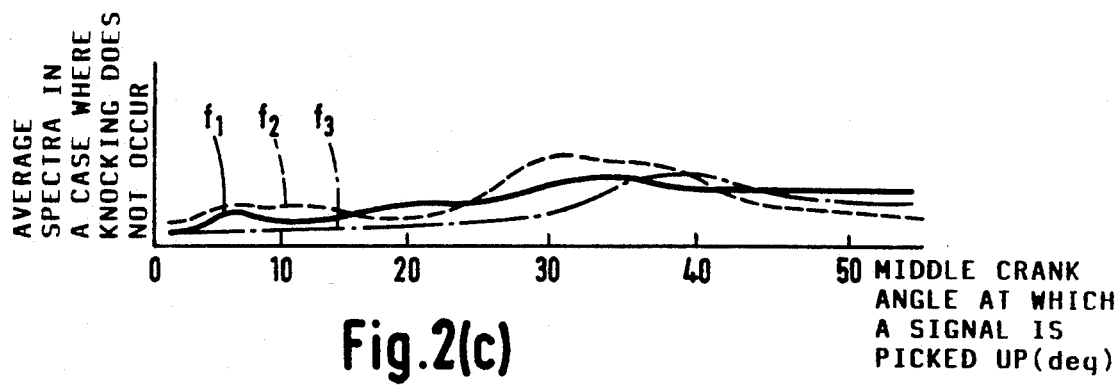
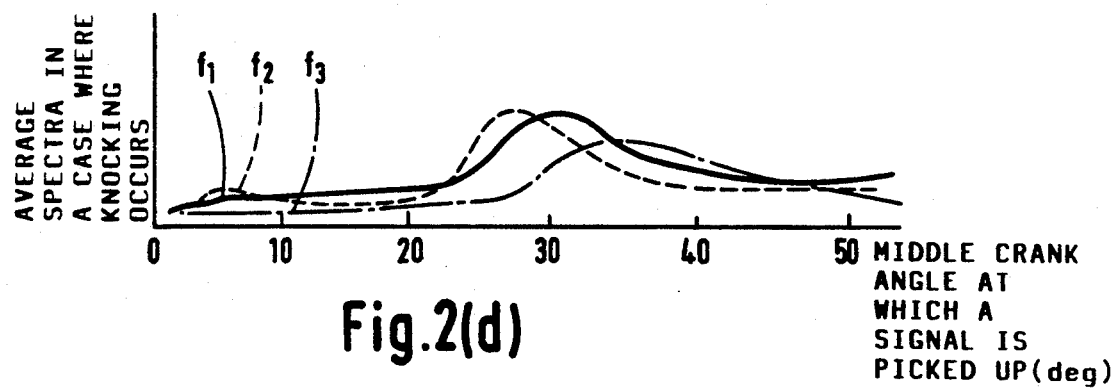

Fig.13(a) POS
Fig.13(b) REF
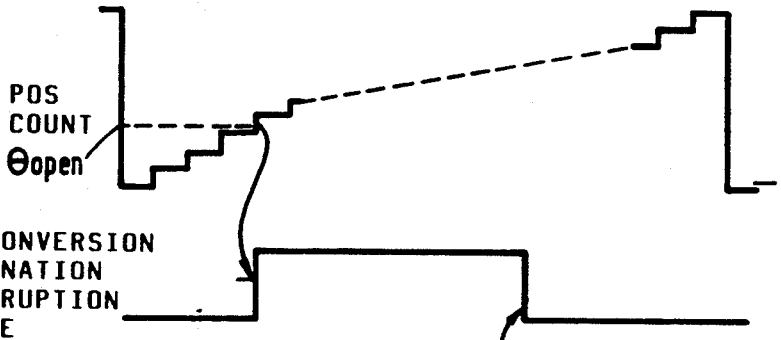
Fig.13(c) POS COUNT θopen
Fig.13(d) A/D CONVERSION TERMINATION INTERRUPTION ENABLE
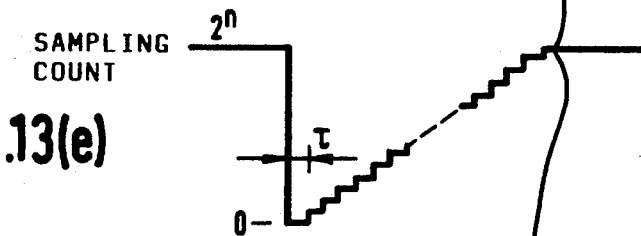
Fig.13(e) SAMPLING COUNT $2^n$ τ 0
Fig.13(f) FREQUENCY ANALYSIS FLAG
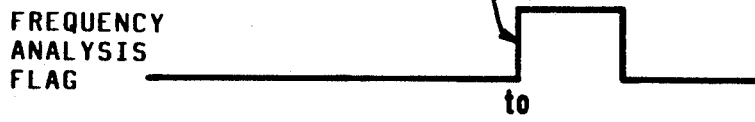
to
Fig.13(g) KNOCK OCCURRENCE FLAG — KNOCK / NO KNOCK
Fig.13(h) IGNITION TIME θref Tadv +1° +1°
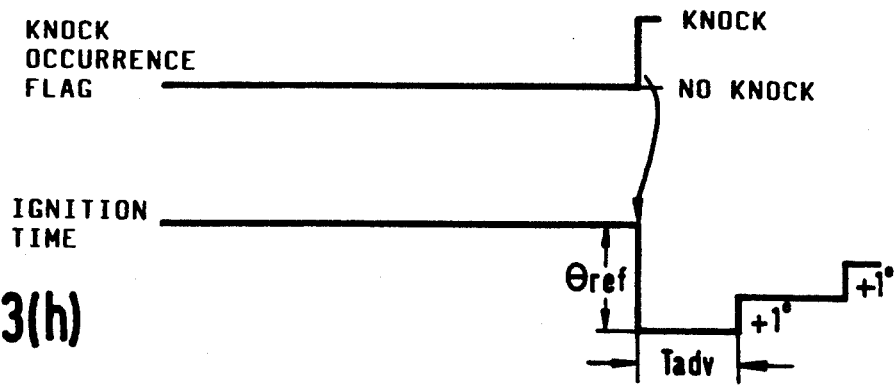
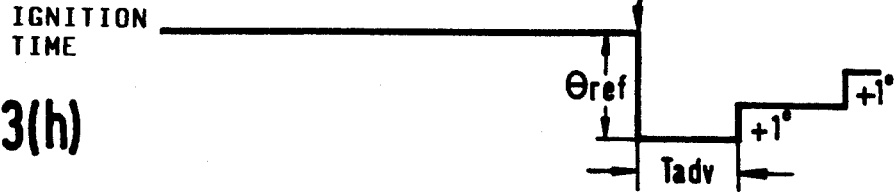

METHOD AND APPARATUS FOR DETECTING KNOCK IN AN INTERNAL COMBUSTION ENGINE

BACKGROUND OF THE INVENTION

1. Field of the Invention

This invention relates to a method of detecting knocking in an internal combustion engine and an apparatus therefor.

2. Description of Related Art

There are various kinds of known knock detecting methods and apparatus therefor adapted to detect a knocking phenomenon occurring in an internal combustion engine. For example, Japanese Patent Laid-open No. 45520/1983 discloses a knock detecting apparatus adapted to filter a frequency, which is peculiar to knocking, of an output signal from a knock detecting sensor, and to decide the occurrence of knocking by judging whether the amplitude of the frequency component exceeds a predetermined level or not.

However, in this prior art apparatus, a knock signal is always evaluated in the same range of crank angles, that is a predetermined "window" position and arcuate length of crank angles is used for the knock detection. Because the range over which knock detection is made is predeterminedly fixed, it is not possible to accurately determine the crank angle at which the maximum amplitude of knocking occurs. In this respect, the maximum amplitude of knocking varies with frequency and the present inventors have found that the frequency varies with crank angle position. If, as in the prior art, an overly wide window is used to detect the frequency of knocking, the window position also being fixed, so it has been found that noise frequency components based, for example, caused by the vibration of a valve, can have a major effect in the measurement window and cause a misjudgment of the frequency (and thus crank angle) of knocking.

It will be appreciated that the engine block has a particular resonance frequency and that the frequency of knocking in the prior art is detected by evaluating the energy of the vibration. As mentioned above, vibration from mechanical sources made by the operation of, for example, inlet and exhaust valves, cause other resonant frequencies. It is disclosed in Japanese Patent Application Laid-Open No. 63-219874 to use more than one filter to separate particular resonance frequencies. More than one filter is normally used if analog comprised of discrete parts are used or if digital filters are used.

However, both the above-mentioned prior art attempts to accurately detect the frequency and, hence, crank angle position of knocking are inflexible, and because filters are used it is essential that the central frequencies of the filters are predeterminedly fixed. This makes it impossible to correctly adjust the filters central frequencies to resonance frequencies in a situation where resonant frequencies change due to a change in the operating conditions of the engine and the aged deterioration of the engine itself. Thus, the prior art is unable to implement a high precision detection of knock in internal combustion engines. Moreover, the prior art attempt has the disadvantage that if analog filters are used, a like number of filters are required as the number of frequencies to be separated, thereby increasing the cost and size of the filters.

It is an object of the present invention to attain an improvement in knock detecting accuracy, which cannot be completely effected by the above known techniques, on the basis of the discoveries made by the inventors of the present invention in their various experiments concerning the relationship between the frequency of a detected knocking signal and a crank angle, and to provide a knock detecting method and apparatus, which are capable of improving an internal combustion engine output power and fuel consumption.

SUMMARY OF THE INVENTION

According to a first aspect of this invention there is provided a method of detecting knocking in an internal combustion engine having a crankshaft and a knock detecting sensor including the steps of detecting engine vibration caused by knocking with said knock detecting sensor between a first and a second moment of time and independently varying at least one of the first and second moments of time in dependence upon a vibration spectrum of frequencies to be detected.

Thus, in the broadest aspect of the invention the "window" at which detection occurs has the start location thereof movable in time and the period of the window of detection is variable in dependence upon time, the essence being that the window is as narrow as possible and movable to detect the maximum frequency of vibration.

Because the phenomenon of knocking occurs over a frequency spectrum it is desired that a plurality of frequency spectra each having a different first and second moment of time are each separately analysed for determining knock intensity.

It will be appreciated that the first and second moments of time may be represented by first and second angles of the crankshaft, although it is to be understood that it is not strictly necessary to relate the moments of time to crankshaft angles, such being performed for convenience.

Advantageously, a plurality of frequency spectra are detected each having different center frequencies.

As described above, the start position of the window is variable in position and so the first crank angle is variable but, in some circumstances, it may be preferred to make the window length predeterminedly fixed and so the difference between the first and second crank angles may be predeterminedly fixed. It is to be noted, however, that the arcuate distance between the first and second crank angles is smaller than in the prior art because the windows of this invention, over which measurement is made, are movable in position, whereas in the filters of the prior art, the window position and length were predeterminedly fixed and necessarily had to be wide in order to detect the knocking phenomenon. Thus, advantageously, the crank angle range between the first and second crank angles is limited to reduce the effect of vibration caused by mechanical noise, such as by reciprocating engine inlet and exhaust valves.

Preferably, frequency spectra are analysed to determine an overall knocking signal level and if said level exceeds a predetermined level then ignition timing of said engine is retarded.

In a currently preferred embodiment the spectrum of frequencies is detected at a plurality of sampling points within said spectrum wherein the samples at said sampling points are analysed. In such an embodiment said analysis is Fast Fourier Transform or Walsh to Fourier Transform, both analysis known per se.

Because engine knocking varies in dependence upon engine operating parameters, preferably said first and second angles are varied in dependence upon engine r.p.m., engine water temperature, intake air temperature, intake air humidity or engine mileage.

Advantageously, said spectra of frequencies is each representative of a mode of vibration within a respective cylinder of said engine. In an embodiment of the invention, advantageously for each frequency spectrum, the frequency of maximum amplitude is detected by analysing data at two or more consecutive frequency samples.

So as to improve the accuracy of the detection of knocking, said frequency of maximum amplitude is multiplied by a weighting factor and the weighted frequency of maximum amplitude for each mode are summed to provide a tone index whereby knock is detected by comparing said tone index with a predetermined signal. The weighting factor employed normally decreases with the signal-to-noise ratio, that is the signal being the frequency of knocking as against the noise being the internal mechanical noise of the engine made by inlet valves, etc.

Thus, if the tone index is above the predetermined signal the engine ignition is retarded.

Advantageously, if said frequency of maximum amplitude is not centrally located within said frequency spectrum the first and second crank angles are shifted in a next cycle to centralise said frequency of maximum amplitude.

According to another aspect of this invention there is provided an apparatus for detecting knock in an internal combustion engine comprising a knock detecting sensor for detecting engine vibration caused by knocking, a timing means for evaluating signals from said knock detecting sensor between a first and a second moment of time, and means for independently varying at least one of the first and second moments of time in dependence upon a vibration spectrum of frequencies to be detected.

Preferably the first and second moments of time are represented by first and second angles of a crankshaft of said engine.

In a preferred embodiment the apparatus includes means for evaluating said vibration spectrum of frequencies detected and means for comparing an output of said evaluating means with a means producing a predetermined signal level, and means for varying the ignition timing of said engine signal if the output of the evaluating means exceeds said predetermined level.

Thus, by the present invention the window of frequency measurement may be varied in position and in length and the centre frequency of the window may be shifted in operation. By the use of this invention the detection of knock is optimized and the result may be used to correct the ignition timing of the internal combustion engine.

The apparatus of this invention conveniently has a knock sensor with a flat frequency characteristic for operating over a range wide enough to include knock detecting signals and, thus, to include more than one particular frequency created on the occurrence of knock and is capable of detecting a plurality of knock signals.

The aged deterioration of the engine is conveniently measured by detecting the mileage of the automobile and the knock detecting apparatus of this invention is capable of evaluating the deterioration of the engine and of shifting the knock detecting measurement window in dependence upon aged deterioration of the engine, whereby detection of knock is optimized. A microcomputer is normally used to analyse the result of sampling so that knock detection is evaluated in real time so as to optimize engine output and combustion efficiency.

BRIEF DESCRIPTION OF THE DRAWINGS

FIGS. 2(a)–2(f) show in graphical form a method of determining an optimum range of crank angles corresponding to frequencies to be detected;

FIGS. 13(a)–(h) show waveforms useful in explaining the operation of the apparatus of FIG. 10;

In the Figures like reference numerals denote like parts.

DESCRIPTION OF THE PREFERRED EMBODIMENT

Before describing the embodiments, the facts, which the inventors of the present invention have ascertained, regarding the relationship, which constitutes the basis of the present invention, between an output signal from a knock detecting vibration sensor, and a crank angle at which the pickup of the output signal is started will be illustrated with reference to FIGS. 1(a) and 1(b) of the accompanying drawings.

Figure 1A:
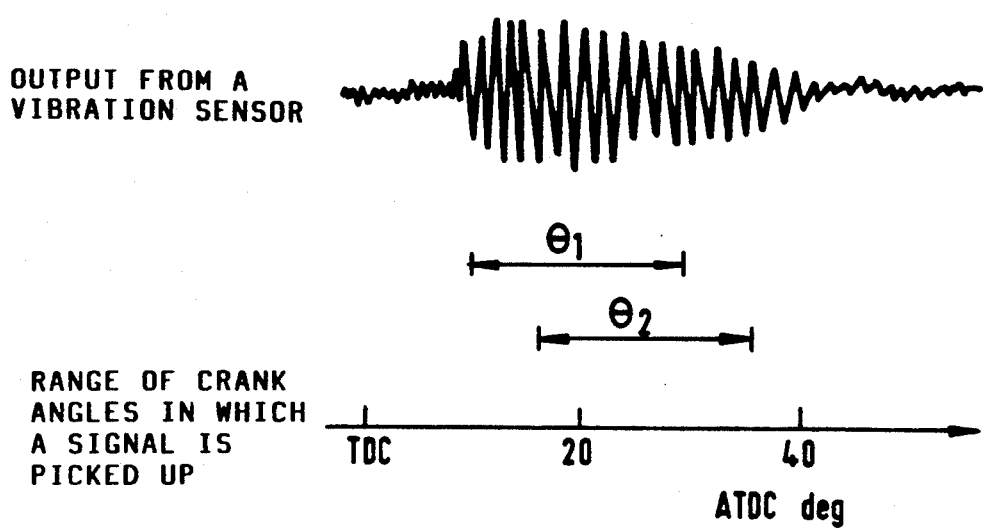
FIGS. 1(a) and 1(b) show a waveform diagram and a graph respectively of the relationship, which constitutes the basis of the present invention, between the range of crank angles after top dead center (ATDC) in which an output signal from the knocking sensor is picked up (detected) and a vibration component.
Figure 1B:
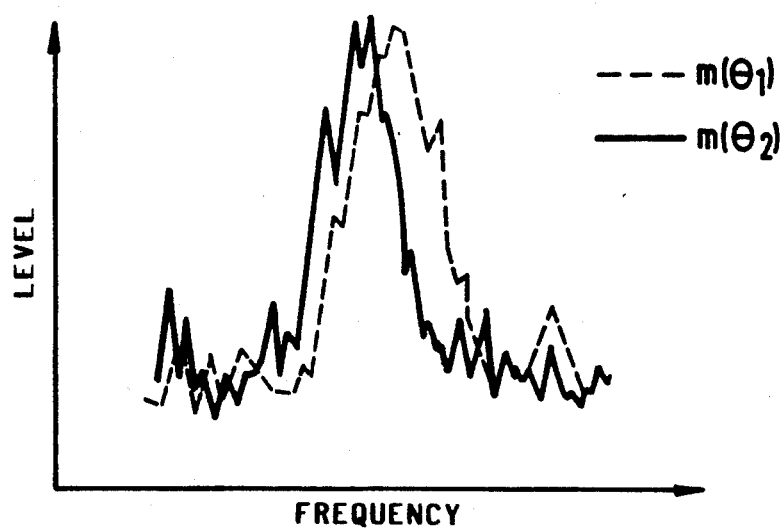

FIG. 1(a) shows an output signal from an engine vibration detecting sensor, and a range of crank angles $\theta_1$ (starting from 10° after TDC) at which the pickup of the output signal is started and a range of other crank angles $\theta_2$ (starting from 16° after TDC) to which $\theta_1$ is to be changed, where TDC denotes top dead center and ATDC denotes after top dead center. For the benefit of explanation the range of crank angles, that is time or arcuate length of angle $\theta_1$ and $\theta_2$ are the same, their starting position only being varied. However, this invention contemplates both the starting point of $\theta_1$ and $\theta_2$ being different from one another and the time or angles $\theta_1$ and $\theta_2$ being different from one from one another. The results of a frequency analysis carried out with respect to each of these crank angles are shown as $m(\theta_1)$, $m(\theta_2)$ in FIG. 1(b). As is clear from these Figures, the characteristic frequency of knocking fluctuates when the commencement point of detection for a range of crank angles is varied (even when $\theta_1$ equals $\theta_2$). It is considered that the cause of this phenomenon resides in the fluctuation of natural frequency of knocking which is due to the variation of temperature in a cylinder in an expansion stroke. Therefore, in order to judge the occurrence of knocking with reference to a vibration component at a specific frequency, a signal is picked up in the range of crank angles in which the characteristics of knocking most distinctly appear with respect to the frequency, and hence knock detecting accuracy is improved.

A method of predetermining the range of crank angles at which the pickup of signal is carried out with respect to each frequency will now be described with reference to FIG. 2.

FIG. 2(a) shows the output from a vibration sensor and FIG. 2(b) shows the range of crank angles $\theta_1$, $\theta_2$ . . . $\theta_n$ at which the vibration sensor output is detected (picked up).

Figure 2E:
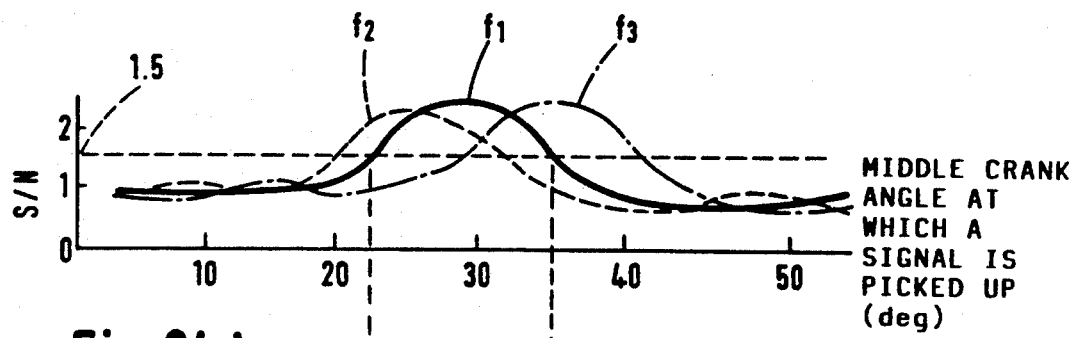

FIGS. 2(c) and 2(d) show the results of determination of spectral levels of different frequencies $f_1$, $f_2$, $f_3$ in a frequency analysis carried out with the crank angle, in which the vibration sensor output signal is changed in the FIGS. 2(c) and 2(d) respectively. In FIG. 2(c) the spectral level of frequency corresponds to a case where knocking is not detected and in FIG. 2(d) the spectral level of frequency corresponds to a case where knocking occurs and both graphs are plotted correspondingly to the crank angles in the middle of the ranges of crank angles in which the frequency analysis is carried out. Since the time of occurrence of knocking fluctuates slightly in every ignition stroke, these spectral levels are determined by averaging spectral levels corresponding to a predetermined number of ignition strokes (for example, 50 ignition strokes). FIG. 2(e) shows a ratio of spectral level in a case where knocking occurs to that in a case where knocking is not detected, that is a S/N ratio determined with respect to each frequency and correspondingly to each crank angle range on the basis of what is shown in FIGS. 2(c) and 2(d) whereby the crank angle ranges for $f_1$, $f_2$, $f_3$ may differ from one another.

The range of crank angles in which the pickup of a signal is carried out is set on the basis of what is shown in FIG. 2(e) to a range in which the S/N ratio with respect to each frequency becomes not lower than a predetermined level (for example, not less than 1.5).

Figure 2F:
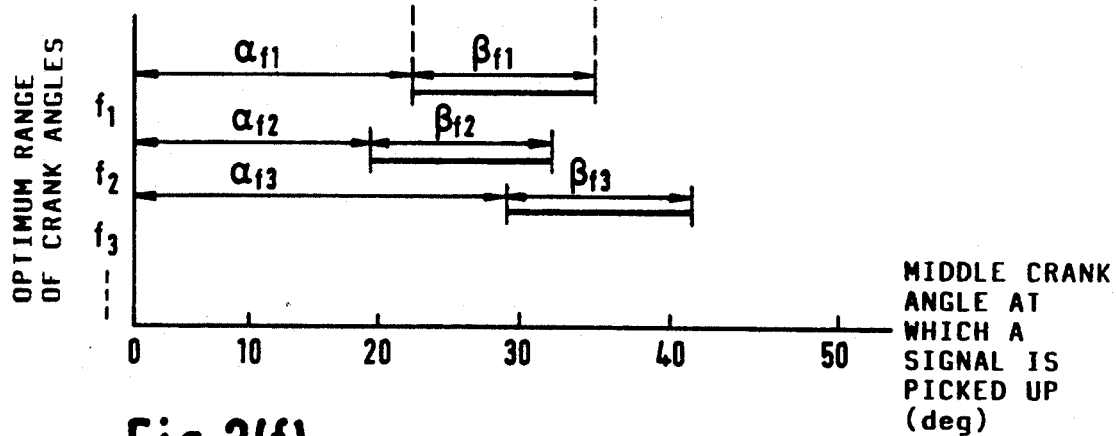

As shown in FIG. 2(f) this procedure enables the determination of a crank angle $\alpha_{fi}$ (where i relates to frequency 1, 2 . . . ) at which the pickup of a signal is started, and the range $\beta_{fi}$ (i=1, 2 . . . ) of crank angles corresponding to the time between the starting of pickup of signal and the ending thereof (these times being the same or different from one another).

Figure 3:
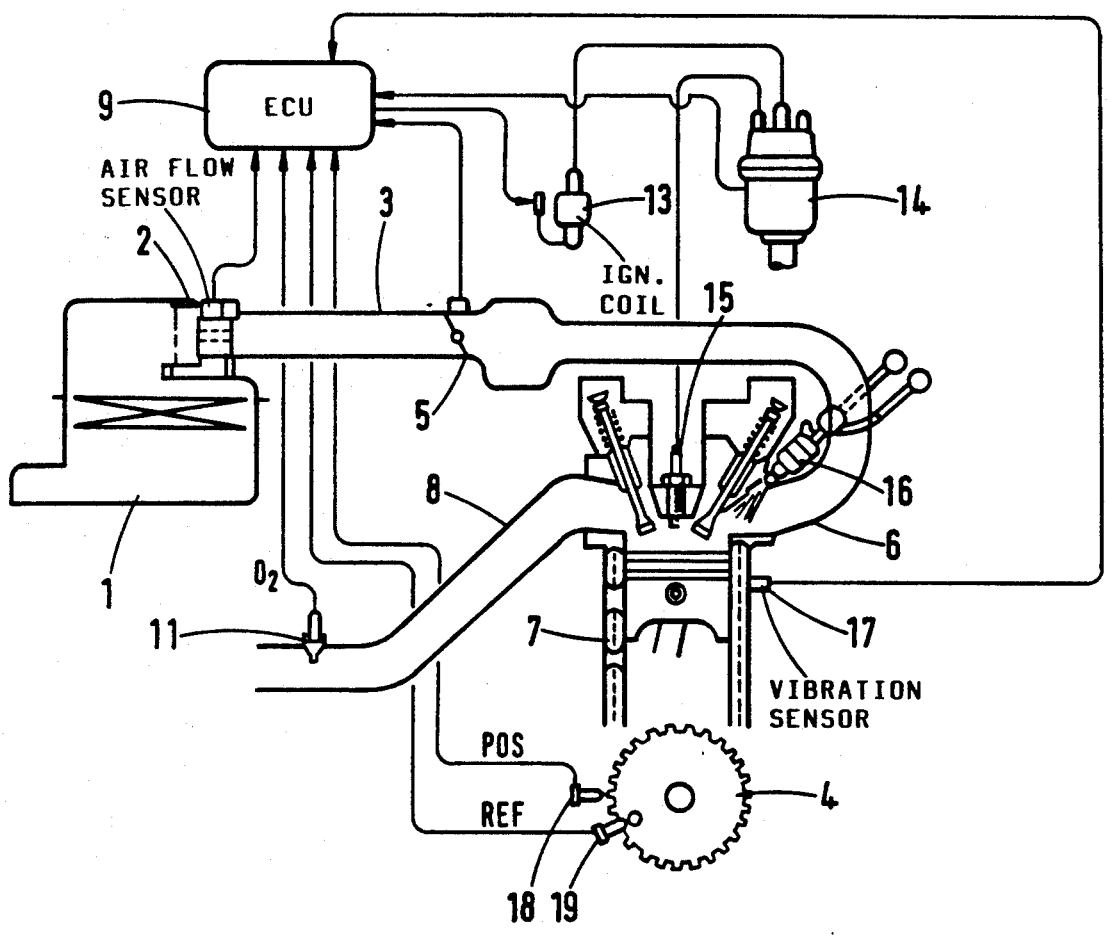
FIG. 3 shows the entire system of a control apparatus for an internal combustion engine which employs an embodiment of the knock detecting apparatus in accordance with the present invention.

FIG. 3 shows an embodiment of system configuration of a control apparatus for an internal combustion engine. Air enters the inlet of an air cleaner 1, and is sucked into a cylinder of an engine 7 through a duct 3, containing a throttle body 5 having a throttle valve, and a suction pipe 6. The flow rate of the inlet air is detected, for example, by a hot wire type air flow sensor 2 provided in the duct 3, and a signal representative of the flow rate detected is inputted to an engine control unit (ECU) 9. Fuel injected from an injector 16 is mixed with the sucked air, and the resultant gaseous mixture is supplied into the cylinder of the engine 7. A high voltage generated in an ignition coil 13 is distributed by a distributor 14 to an ignition spark plug 15 of each cylinder of the engine. The gaseous mixture sucked into the cylinder is then compressed in the engine 7, ignited by the ignition spark plug 15 and thereafter discharged from an exhaust pipe 8. The exhaust pipe 8 may be provided with an exhaust gas sensor 11 (for example, an oxygen ($O_2$) sensor), an output signal from which is also inputted to the control unit 9.

The rotational condition of the engine is detected by a crankshaft 4 POS crank angle sensor 18, from which a POS signal (crank angle position signal) and a crank angle reference sensor 19 from which a REF signal is outputted indicative of a crank angle reference position. A vibration detecting sensor 17 is attached to the engine 7, and an output signal therefrom is also inputted into the control unit 9. The control unit 9 is adapted to compute the fuel feed rate and ignition time on the basis of the signals from the foregoing and various other sensors (such as water temperature) and to output a control signal to each actuator of the engine.

Figure 4A:
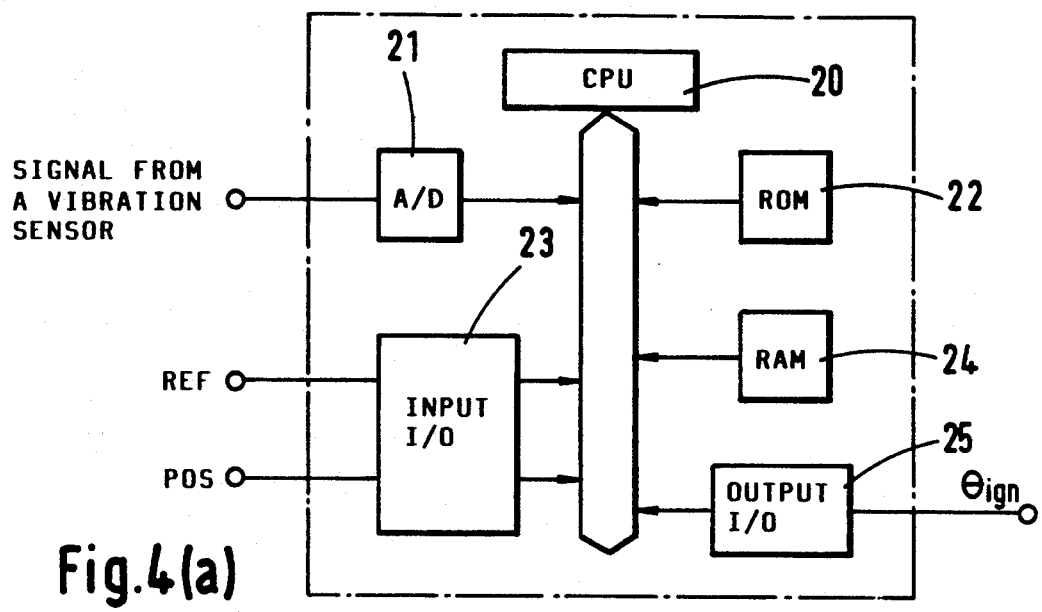
FIG. 4(a) shows a block circuit diagram of the inner portion of a controller used in the knock detecting apparatus in accordance with one embodiment of this invention which is employed in the apparatus of FIG. 3.

FIG. 4(a) shows the construction of part of the engine control unit 9. In this respect, the control unit 9 consists of a CPU 20, an A/D converter 21, a ROM 22, an input I/O 23, RAM 24 and an output I/O 25. The REF signal and the POS signal detected by the crank angle sensor 12 are inputted into the CPU 20 through the input I/O 23. An output signal from the vibration sensor 17 is inputted into the CPU 20 through the A/D converter 21. The CPU 20 is adapted to carry out computation in accordance with a program held in the ROM 22, and the result of the computation is outputted as an ignition timing signal $\theta_{ign}$ from the output I/O 25 to the relevant actuator. The crank angle at which the pickup of a signal from the vibration sensor is started and the range of crank angles are set to optimum levels by the above-described procedure and stored in the ROM 22, and the retention of necessary data during the computation is performed by the RAM 24.

Figure 4B:
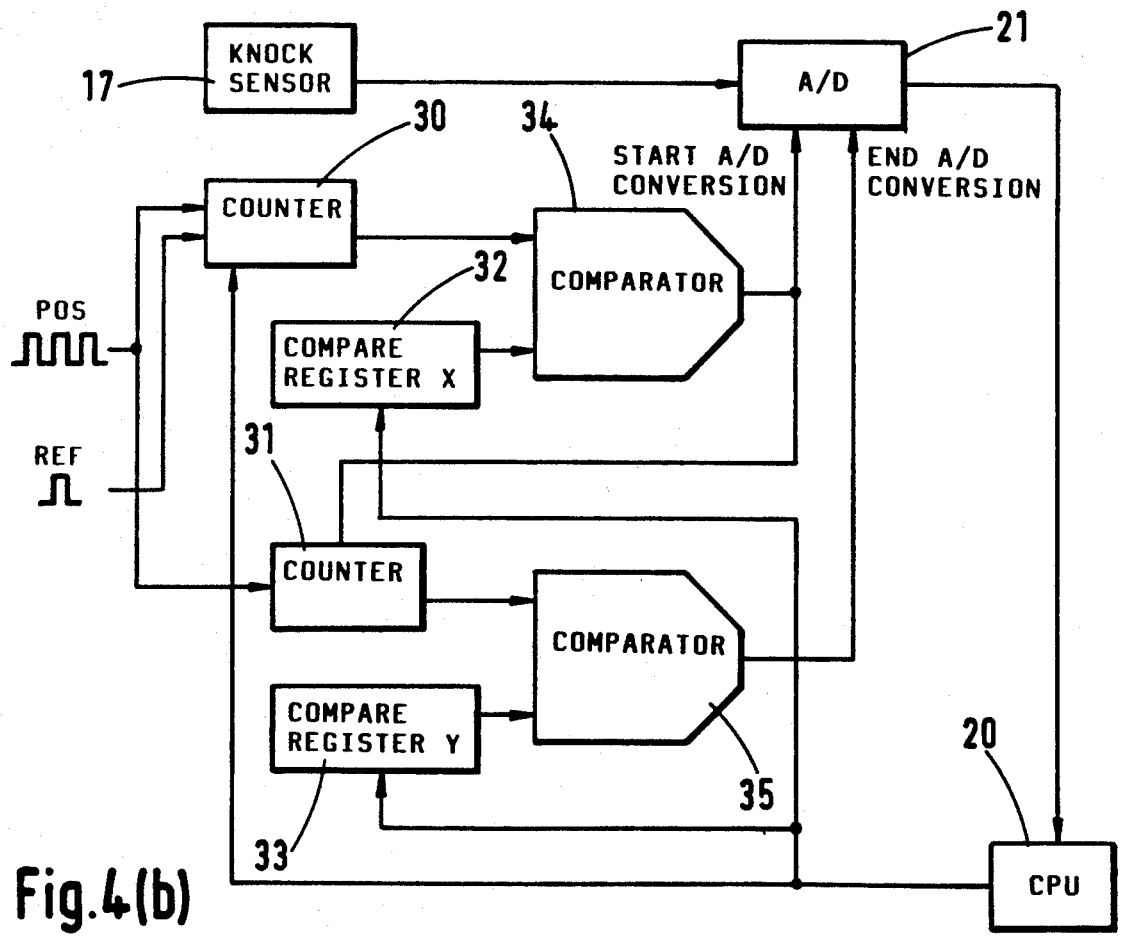
FIG. 4(b) shows a block schematic diagram of the construction of a knock signal pickup.
Figure 4C:
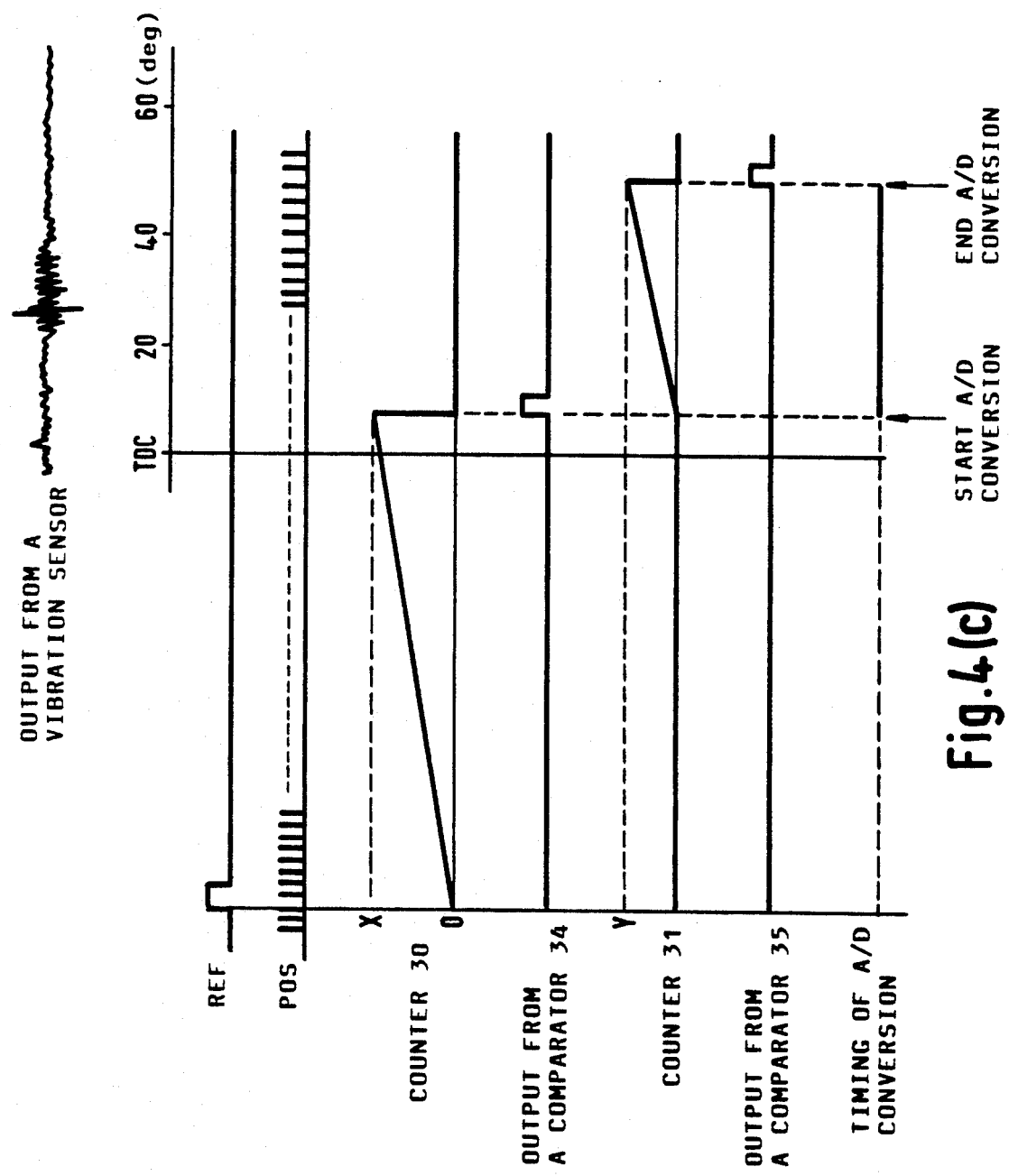
FIG. 4(c) shows a time chart illustrating the operation of the knock signal sensor.

The operation of picking up a signal from the vibration sensor will now be described with reference to the construction of the pickup shown in FIG. 4(b) and the time chart shown in FIG. 4(c). Referring to FIG. 4(b), a counter 30 is for use in determining the crank angle based on the rising part of the REF signal, counter 3 is for use in determining the variation of crank angle during the time after starting the pickup of the signal, compare register 32 is adapted to set an angle $\theta_{fi}$ at which the pickup of the signal is started, and compare register 33 is for use in setting the range $\beta_{fi}$ of crank angles corresponding to the time of pickup of signal (values on these compare registers 32, 33 are set by the CPU 20). Comparator 34 is adapted to check an actual crank angle as to whether it agrees with a predetermined value X, and comparator 35 is adapted to check the variation of crank angle during the time between the starting and ending of pickup of a signal as to whether the level of the variation agrees with another predetermined value Y. When the agreement mentioned above is ascertained in the comparators 34, 35, trigger signals for ordering the starting and ending of A/D conversion are outputted therefrom to the A/D converter 21. An A/D converted signal is inputted into the CPU 20. In this embodiment, the number set by the counters, compare registers, comparators and A/D converters correspond to the frequency to be detected.

Referring to the time chart of FIG. 4(c), the procedure for carrying out a signal pickup operation will be described. The counter 30 is adapted to count the POS signal from the time of initiation of the REF signal. The crank angle $\alpha_{fi}$ at which the pickup of the vibration sensor signal is started is set by the number of POS signals starting from initiation by the signal reaching the predetermined value X required by the compare register 32. Thus, when the value in the counter 30 agrees with the predetermined value X required by compare register 32, an output signal from the comparator 34 rises, and the A/D conversion is started. The counter 31 is adapted to count the POS signals from the time at which the output signal from the comparator 34 rises. The range $\beta_{fi}$ of crank angles corresponding to the time during which the vibration sensor signal is picked up is set as the number of POS signals starting from the time of beginning of A/D conversion in the compare register 33. When the value in the counter 31 reaches the value Y, an output signal from the comparator 35 rises, and the A/D conversion ends. These actions are performed for each of the different detected frequencies.

Figure 5:
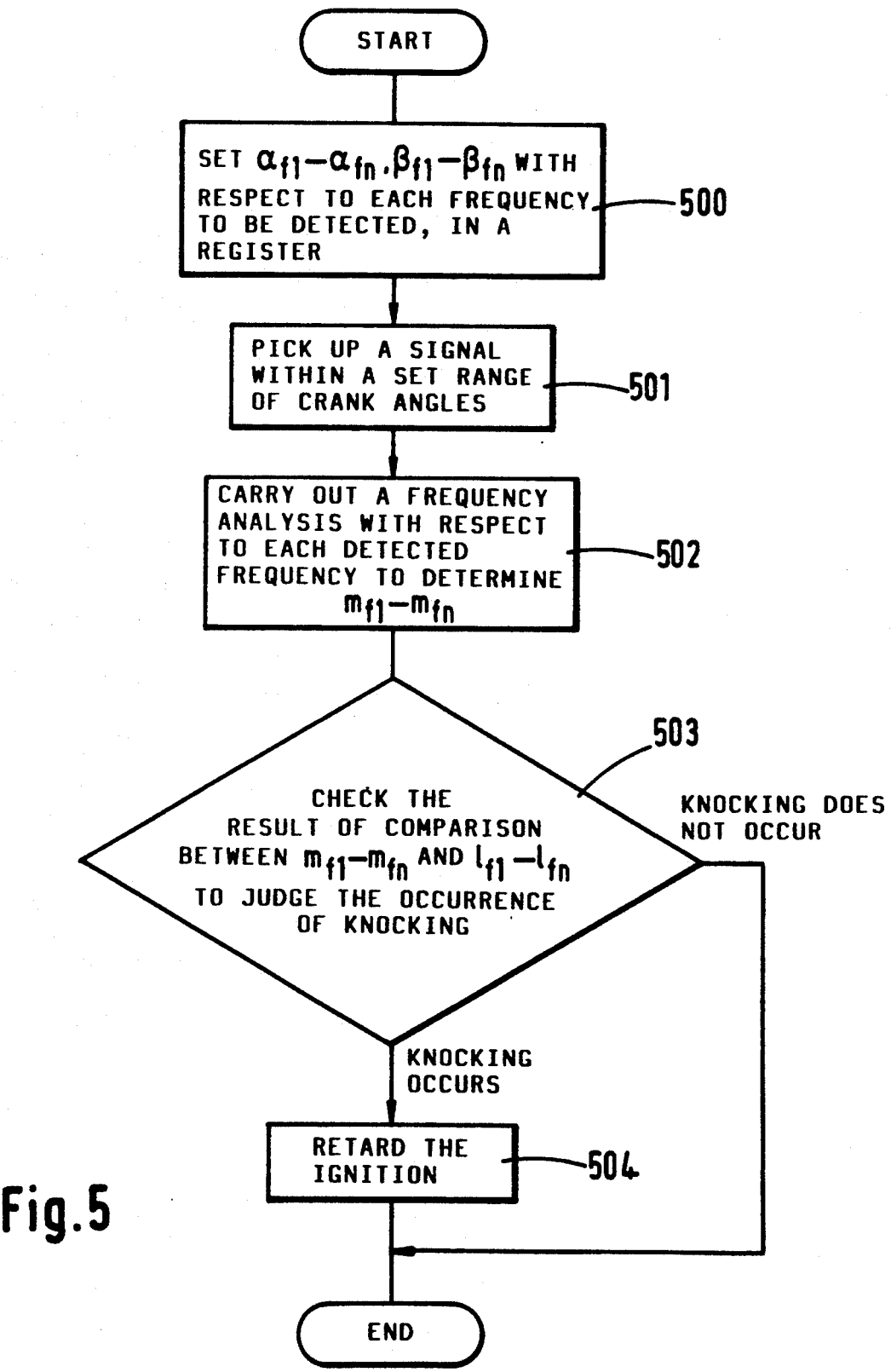
FIG. 5 shows a flow chart of a signal processing operation for judging the occurrence of knocking in the embodiment of FIG. 3.

The computation made by the CPU 20 for determining the occurrence or non-occurrence of knocking will now be described with reference to the flow chart of FIG. 5.

First, in a step 500, the values of crank angles $\alpha_{f1}-\alpha_{fn}$ at which the pickup of signals is started and the ranges $\beta_{f1}-\beta_{fn}$ of crank angles in which the pickup of signals is carried out, with respect to the detected frequencies $f_1-f_n$ of the output signals from the vibration sensor, which are read and set in the compare registers $X_1-X_n$, $Y_1-Y_n$ are preset in accordance with the above-described procedure.

In a step 501, a signal is picked up in accordance with the above described procedure within the range of crank angles set in the step 500 with respect to each detected frequency. The pickup of a signal referred to above is performed in a predetermined sampling cycle (for example, every 12$\mu$ sec).

In a step 502, the data received with respect to each detected frequency is subjected to a frequency analysis to determine the magnitude $m_{f1}-m_{fn}$ of a vibration component. FFT. (Fast Fourier Transform) or WFT (Walsh to Fourier Transform described by Nobuo Kurihara on pp. 38–44, "Keisokujido-gakkai Ronbunshu 18, No. 10 (October 1982)"), both known per se, may be used as a frequency analysis method.

In a step 503, $m_{f1}-m_{fn}$ determined in the step 502 and predetermined levels $l_{f1}-l_{fn}$ set beforehand with respect to each detected frequency are compared with each other, and, for example, when any one of the $m_{f1}-m_{fn}$ is larger than the predetermined levels $l_{f1}-l_{fn}$, a decision that knocking occurs is given. When a decision that knocking occurs is given, the ignition is retarded with respect to normal ignition time in a step 504.

Another embodiment of the present invention will now be described. In this embodiment, the invention is applied to a knocking apparatus in which the frequency to be detected is changed in accordance with the operational condition of the engine, which is represented by the number of revolutions per minute thereof, so as to improve the signal detecting accuracy.

Although the construction of the apparatus in this embodiment is identical with that of the apparatus in the above-described embodiment, the knocking detecting procedure in the former is different from that in the latter.

A frequency to be detected is changed in dependence upon the number of revolutions per minute of the engine with reference to the following Table 1, and the range of crank angles in which the pickup of a signal is carried out is changed in dependence upon the changed frequency to be detected.

TABLE 1

| Number of revolutions per minute of engine (rpm) | Frequency to be detected | Crank angle at which the pickup of signal is started | Range of crank angles in which the pickup of signal is carried out |
|---|---|---|---|
| 1000–2000 | $f_1$ | $\alpha_{f1}$ | $\beta_{f1}$ |
| 2000–3000 | $f_2$ | $\alpha_{f2}$ | $\beta_{f2}$ |
| 3000–5000 | $f_3$ | $\alpha_{f3}$ | $\beta_{f3}$ |

Figure 6:
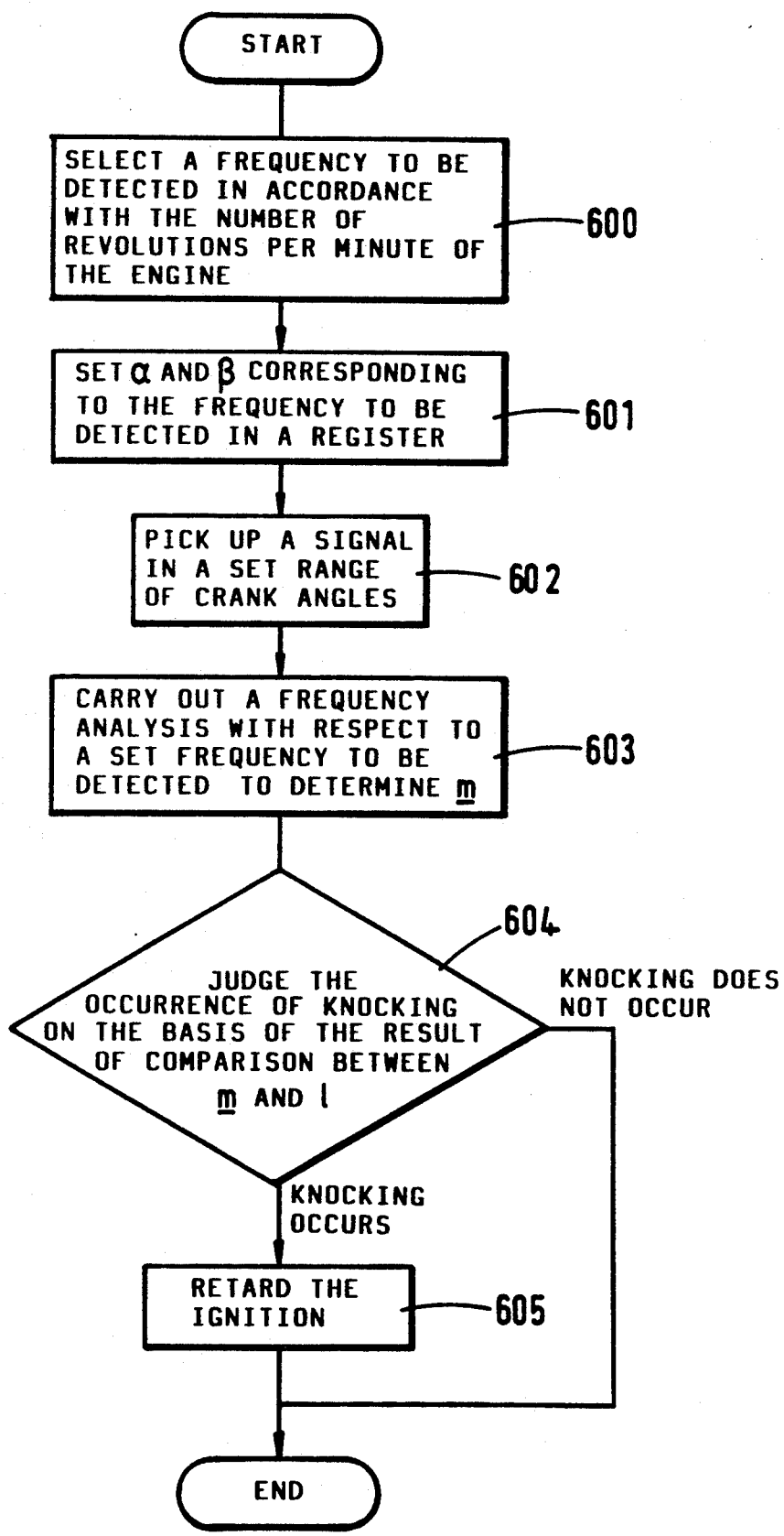
FIG. 6 is a flow chart showing a signal processing operation for judging the occurrence of knocking in the embodiment of FIG. 3.

The computation carried out in the CPU 20 for judging whether knocking occurs or not will be described with reference to the flow chart in FIG. 6.

In a step 600 in this flow chart, one of the predetermined frequencies to be detected is selected in accordance with the number of revolutions per minute of the engine. In a step 601, a crank angle o at which pickup of a signal is started and the range of crank angles $\beta$ in which the pickup of signal is carried out are set in a register, both $\alpha$ and $\beta$ being pre-set for the particular frequency to be detected which was selected in the step 600. In a step 603, a frequency analysis with respect to the frequency to be detected set in the step 602 is carried out by FFT or WFT to determine the magnitude m of a vibration component. In a step 604, m is compared with a predetermined level 1, and, when the former is higher than the latter, a decision that knocking occurs in given. When a decision that knocking occurs is given, the ignition is retarded in a step 605.

Figure 7A:
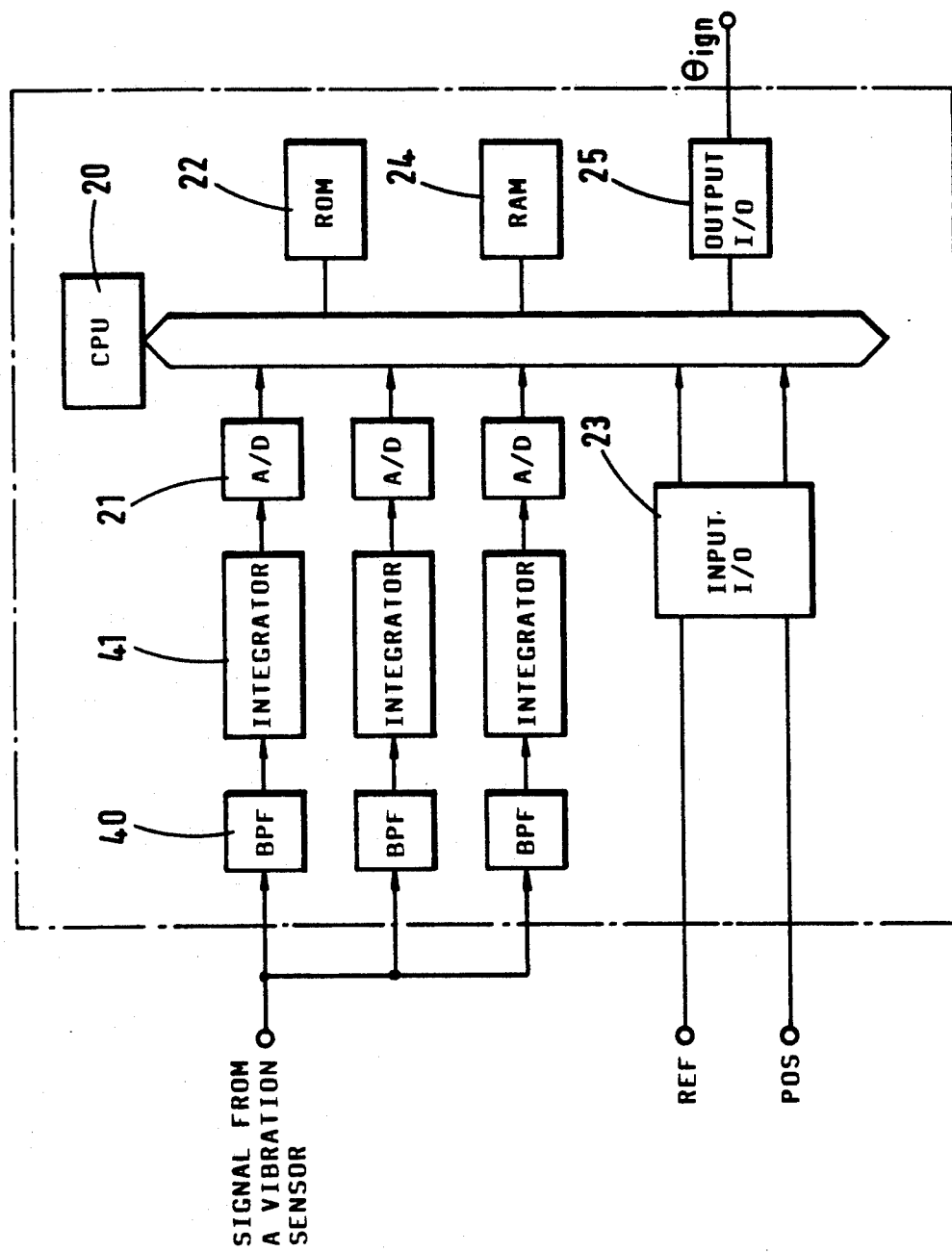
FIGS. 7(a) and 7(b) show block schematic diagrams of another controller and another signal pickup respectively which may be used in the present invention.
Figure 7B:
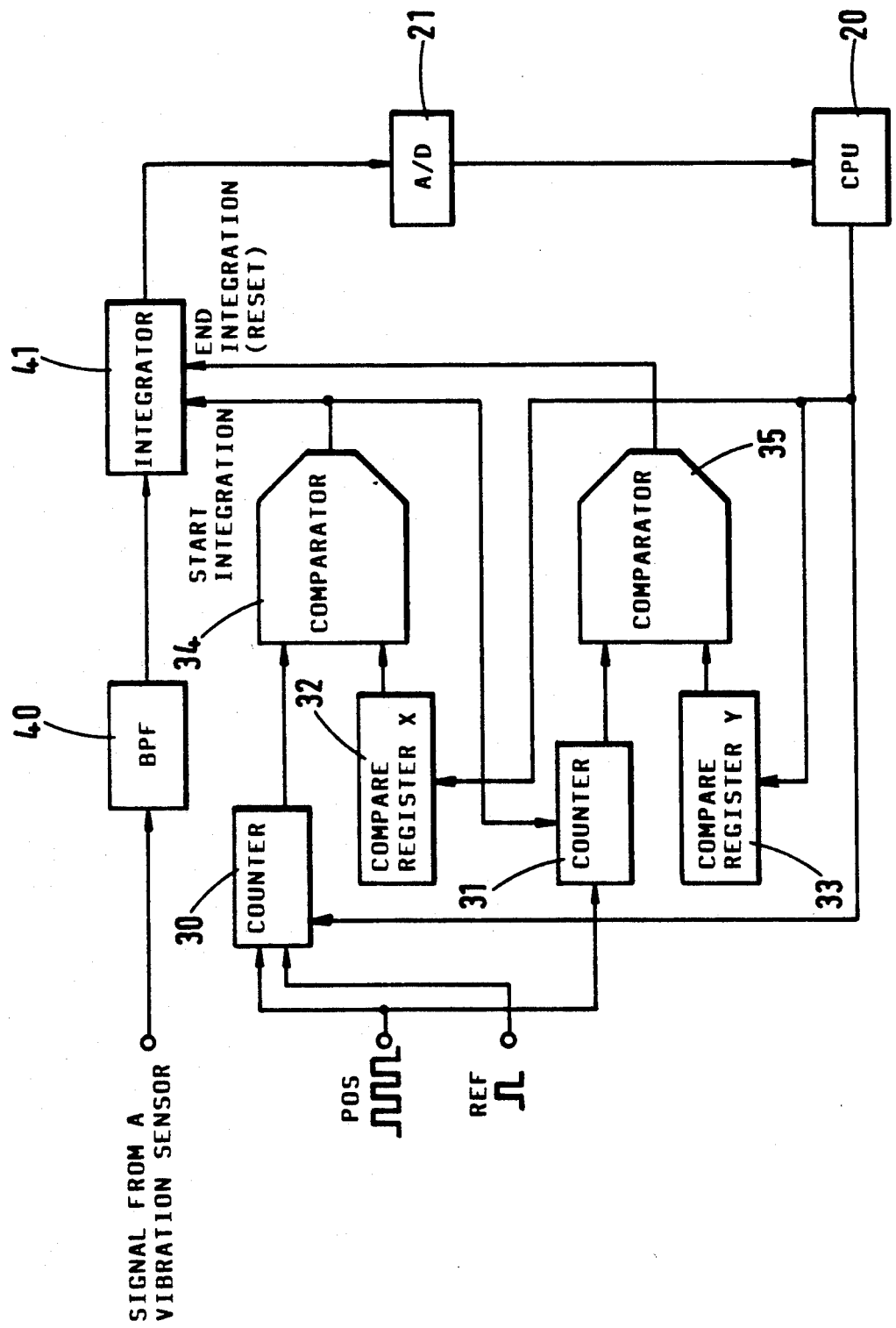

Yet another embodiment of the present invention will now be described. The system configuration of this embodiment is identical with that of the embodiment of FIG. 3. The construction of a control unit 9 in the third embodiment is shown in FIGS. 7(a), 7(b). In FIG. 7(a), a band-pass filter 40 is provided for separating a vibration component of characteristic frequency of knocking from an output signal from the vibration sensor (not shown) and an integrator 41 is provided for carrying out integration of the output signal from the band-pass filter 40 within a predetermined range of crank angles. The number of each of the band-pass filters 40, integrators 41 and A/D converters 21 corresponds to the number of specific frequencies to be detected.

An operation of picking up a signal from a vibration sensor will be described with reference to the construction of hardware shown in FIG. 7(b) and the timing chart of FIG. 8. Referring to FIG. 7(b), the counter 30 determines a crank angle based on the rising edge of the REF signal, counter 31 determines the variation of crank angle occurring after the starting of the pickup of signal, compare register 32 sets the angle $\alpha_{fl}$ in which the pickup of signal is carried out. The values in the compare register 32 is X and in the register 33 is Y, both values being set by CPU 20. Comparator 34 is for checking an actual crank angle as to whether the value thereof agrees with that in the compare register 32, and comparator 35 is for checking the variation of crank angle whether the value thereof agrees with that in the compare register 33.

Figure 8:
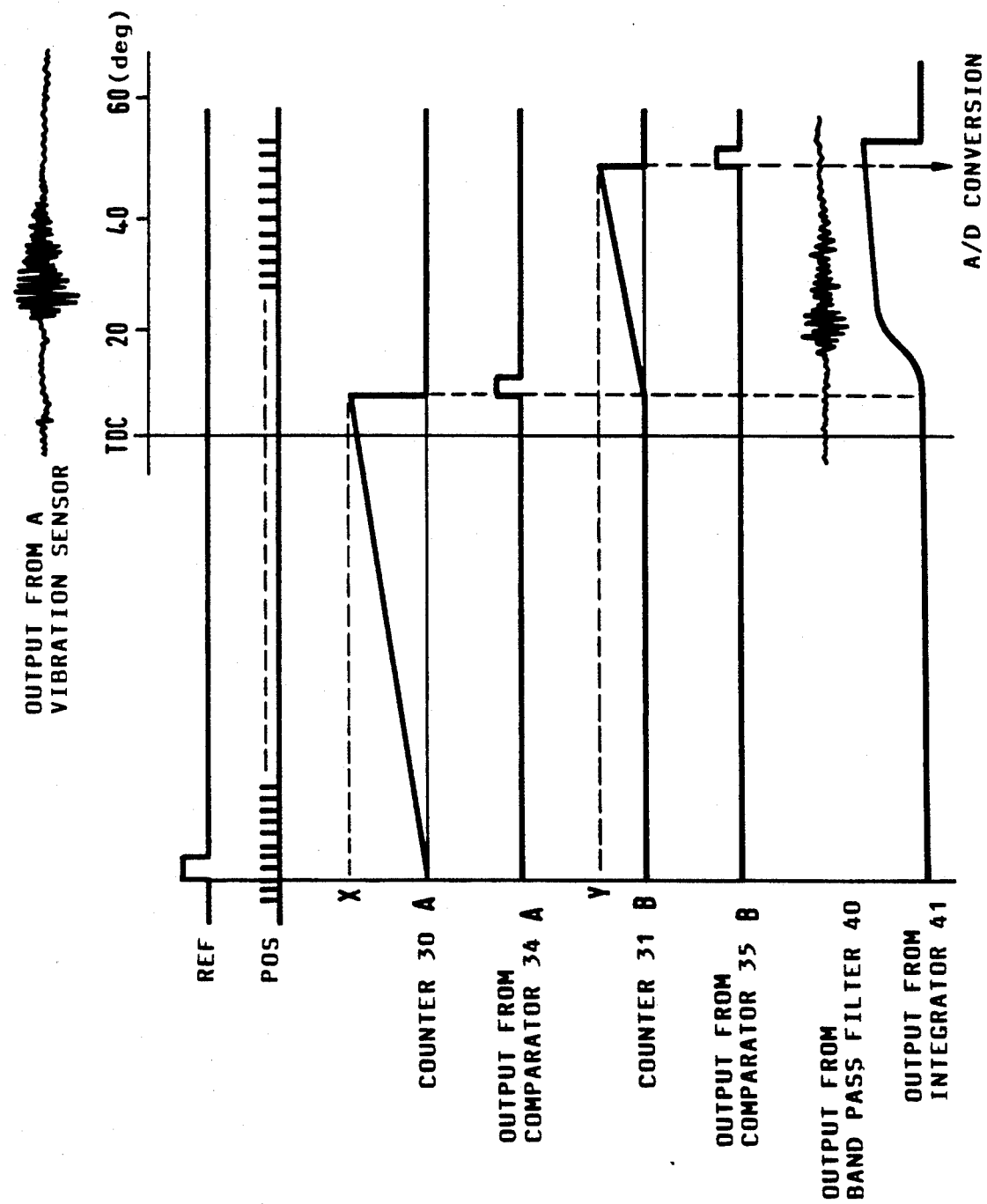
FIG. 8 is a time chart illustrating a signal pickup operation in the embodiment of FIGS. 7(a) and 7(b)

Referring to the time chart of FIG. 8, the rising of a POS signal is counted in the counter 30 to determine the actual crank angle. When the value of the crank angle obtained agrees with the value X in the compare register 32, an output signal from the comparator 34 rises, and an integration operation of the integrator 41 for a vibration component of an output from the vibration sensor is started, the vibration component being obtained through the band-pass filter 40. When the value in the counter 31 agrees with the value Y in the compare register 33, an output signal from the comparator 35 rises, and an output signal from the integrator is then subjected to A/D conversion. These operations are carried out with respect to the vibration component of each frequency. The above operations enable the determination of the level of the vibration component in the preset range of crank angles.

Figure 9:
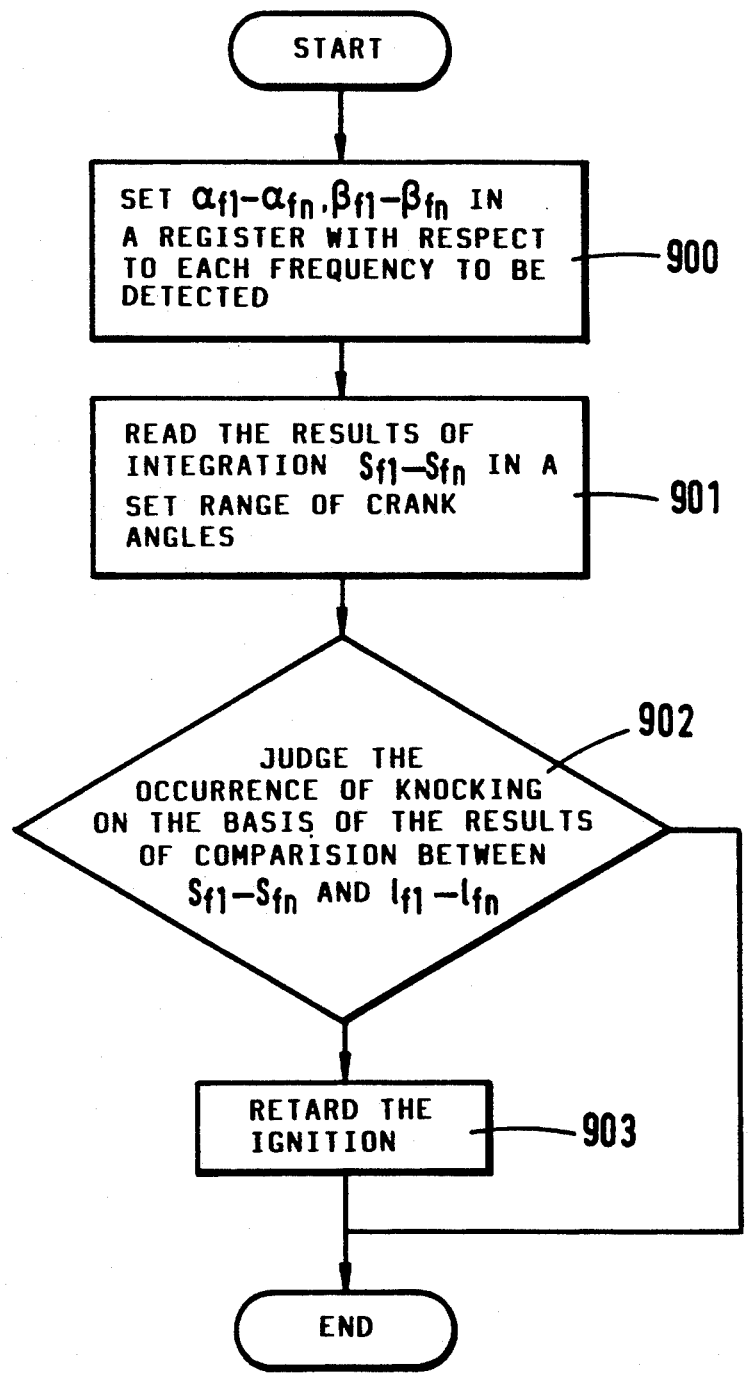
FIG. 9 is a flow chart showing a knocking judging operation in the embodiment of FIGS. 7(a) and 7(b)

The computation mentioned above and carried out in the CPU 20 for judging whether knocking occurs or not will now be described with reference to the flow chart in FIG. 9.

Firstly, in a step 900, crank angles $\alpha_{fl}$–$\alpha_{fn}$ at which the integration of each detected frequency is started and ranges $\beta_{fl}$–$\beta_{fn}$ of crank angles in which such integration is carried out are read and set in compare registers $X_l$–$X_n$, $Y_l$–$Y_n$. These values are set beforehand as described above.

In the integrator in the control unit 9, the integration of each detected frequency is carried out within the range of crank angles set in the step 900. In a step 901, the results $S_{fl}$–$S_{fn}$ of integration of detected frequencies $f_l$–$f_n$ are read.

In a step 902, $S_{fl}$–$S_{fn}$ are compared with levels $l_{fl}$–$l_{fn}$ pre-set with respect to the detected frequencies, and, when $S_{fi}>l_{fi}$ with respect to a predetermined frequency, for example, $f_i$ wherein $i=1-n$, a decision that knocking occurs is given. When a decision that knocking occurs is given in this step, the ignition time is delayed in a step 903.

As mentioned above, a decision of occurrence of knocking is given in this embodiment by using the results of integration of a vibration component in the range of crank angles, in which the characteristics of knocking appear most distinctly with respect to each detected frequency. Accordingly, the knocking detecting accuracy is improved.

In this embodiment, a decision of occurrence of knocking is given by using a plurality of frequencies to be detected. Beside these techniques, the techniques for changing the frequency to be detected, in accordance with a change in the operational condition of the engine and changing the range of crank angles in which integration is carried out in accordance with the resultant frequency to be detected, may also be used.

Another embodiment of this invention will now be described with reference to FIG. 10

Figure 10:
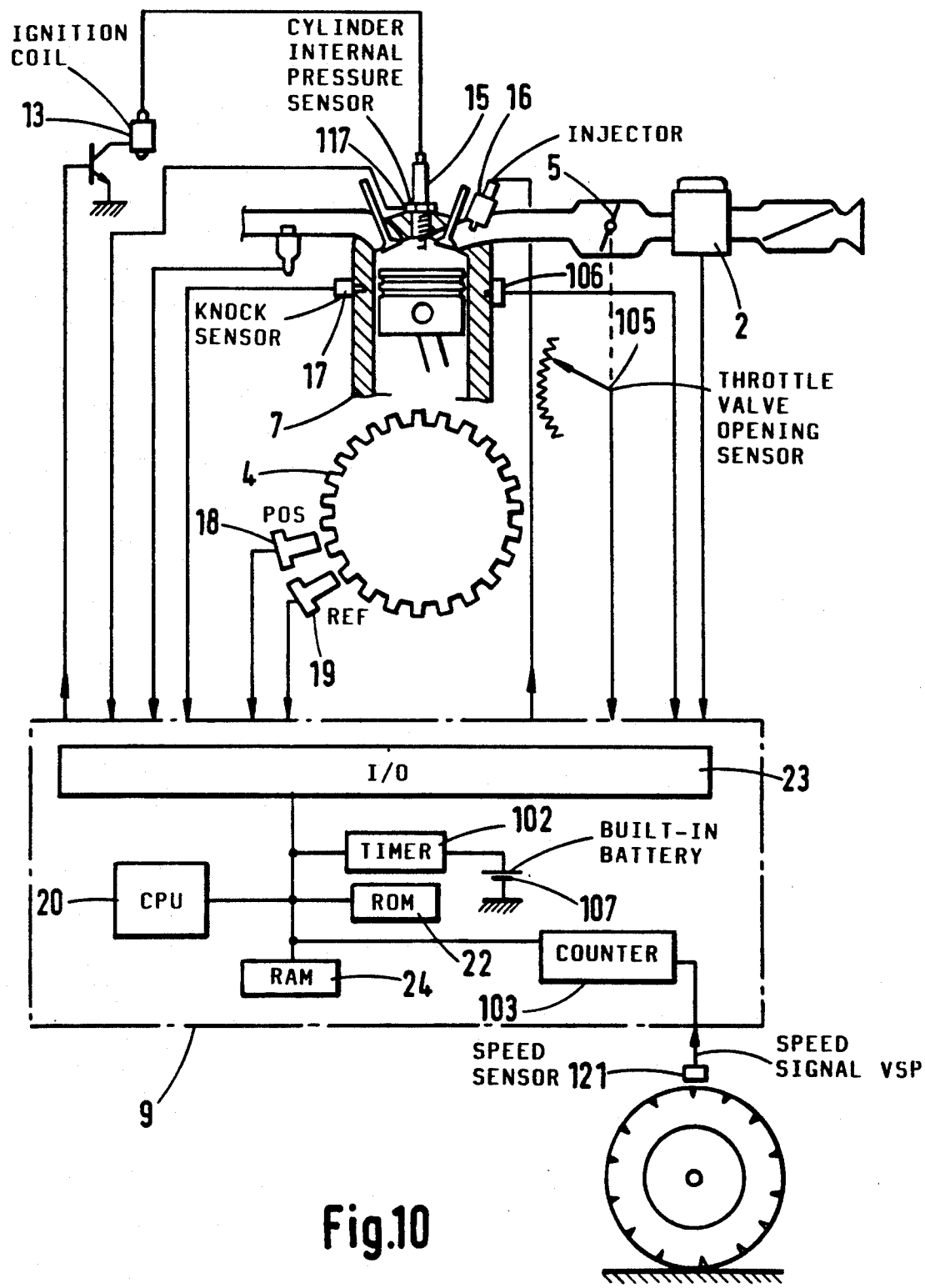
FIG. 10 shows a block diagram of an internal combustion engine to which a knock detecting apparatus in accordance with another embodiment of the present invention is applied.

The internal combustion engine shown in FIG. 10 is applied with the knock detection apparatus of this invention and is similar to the embodiment shown in FIG. 3 except that there are also shown various sensors such as a speed sensor 121, a water temperature sensor 106, and a throttle valve opening sensor 105. The signals from the various sensors are analysed to determine an appropriate fuel injection quantity and ignition timing for the operation of the engine. Thus, the result of analysis is output from the I/O device 23 to operate the fuel injector 16 and the ignition coil 13.

The water temperature sensor 106 measures the temperature Tw of the cooling water for the engine, and the result is used to compensate the control of the engine.

The CPU 20 divides intake air flow by the number of engine revolutions and adds to the result a correction factor determined by, for example, water temperature, in order to calculate injection quantity.

The fundamental value of ignition timing is specified by injection quantity and the number of engine revolutions and is corrected according to the conditions of water temperature and the number of engine revolutions.

The knock sensor 17 is mounted on the cylinder block of the engine to detect vibration on the occurrence of knock and to convert the vibration signal into an electrical signal representative of the vibration.

The knock sensor may alternatively be a cylinder internal pressure sensor 117 attached to the combustion chamber between the spark plug 15 and the engine to detect a change in the pressure inside the cylinder and convert the pressure into a knock representative signal.

The engine control unit 9 has a timer 102 provided for obtaining the total operating time of the engine. A wheel of the automobile is provided with the speed sensor 121 so that a speed signal VSP from the speed sensor 121 can be counted by a counter 103 in the engine control unit 9 to obtain the total distance that the automobile has covered.

The total operating time and the total distance are held in a non-volatile ROM (not separately shown) and a built-in backup battery 107 is provided so that the engine control unit 9 is able to retain engine and vehicle data when the main battery (not shown) power is cut off.

Knocking detection with this embodiment will now be described.

Let the mode with respect to the diameter of a cylinder of the engine 7 be n and for the mode with respect to the circumference of the engine cylinder be m. Then, the vibration of the engine during combustion has a frequency pnm and a corresponding resonance frequency fnm. As an example, an engine used in test gave the values of vibration frequency and resonance frequency shown in FIG. 11(a).

The knock sensor 17 mounted to the cylinder block of the engine is now assumed to have a frequency characteristic including all the above-mentioned frequencies particular to the occurrence of knock and also to be uniformly sensitive to them.

Figures 11A, 11B:
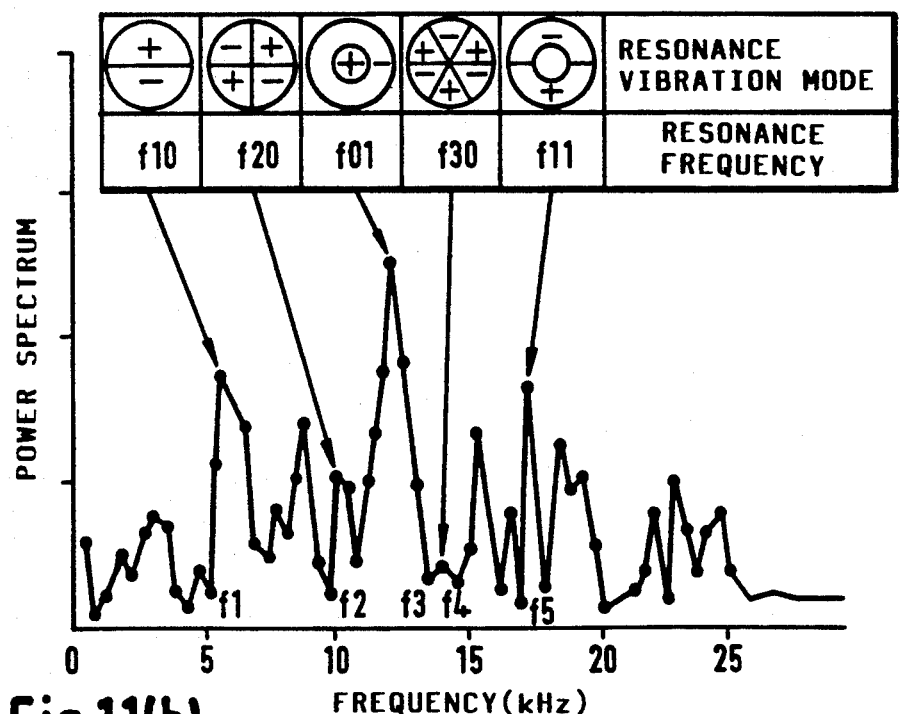
FIGS. 11(a) and 11(b) show an explanatory representation of a resonance vibration mode.

Analysing a knocking signal gives a distribution such as that shown in FIG. 11(b).

Therefore, if the frequency characteristic of the sensor is known in advance to be not flat, the frequency characteristic can be made to be flat by providing the head amplifier, described later herein, with a characteristic which is the inverse of the known frequency characteristic.

Now, the processing of knocking signals will be described with reference to FIG. 12.

A knock signal s is amplified by a head amplifier 120. As stated above, the frequency characteristic of the sensor output is changed inversely by an equalizer 121, and is filtered by low pass filter 122 and amplified by a variable amplifier 123 to be within the voltage input range of an A/D converter 124. The amount of the amplification by the variable amplifier 123 is alterable in accordance with the level of an input signal or the number of engine revolutions in response to instructions from the I/O device 23. However, the amount of amplification is constant in the knock detecting period for knocking signal frequency analysis.

The knock detecting sampling period $2^n$ for knocking signal frequency analysis, operates at a predetermined angle (time) $\theta$open (FIG. 13(c)), at which knock tends to occur, after the top dead centre point. This angle $\theta$open can be found by specifying the leading edge of the reference signal REF (FIG. 13(b)) as zero and by counting the position signal POS (FIG. 13(a)) as shown in FIG. 13(c).

Figure 12:
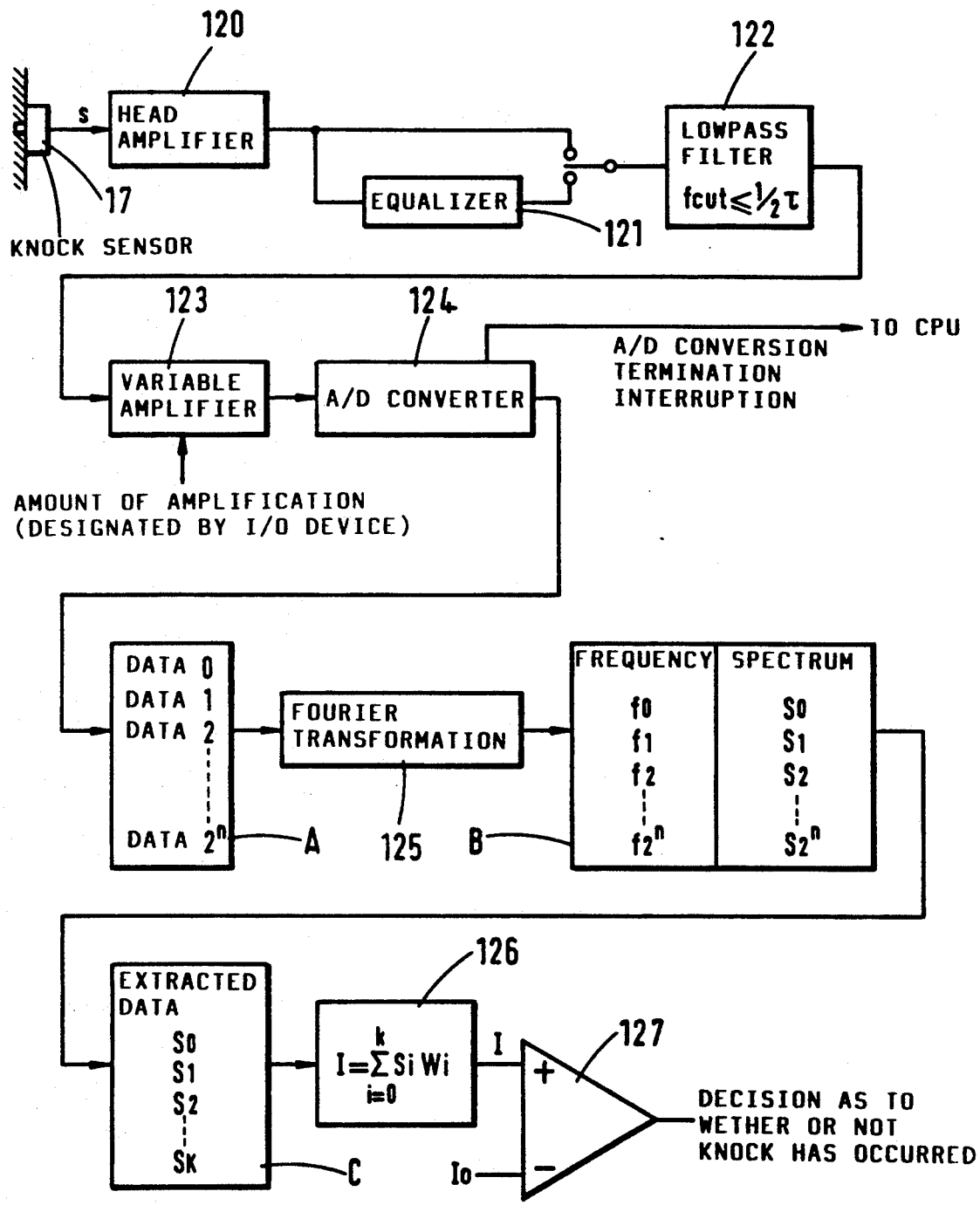
FIG. 12 shows a currently preferred embodiment of a portion of the knock detection apparatus used in the embodiment of FIG. 10.

When the result of the counting coincides with the angle $\theta$open the CPU is enabled for an A/D conversion termination interruption, FIG. 13(d), thereby starting the processing by the A/D converter 124 shown in FIG. 12.

This A/D conversion is, as shown in FIG. 13(d), performed at predetermined data cycles each having period $\tau$. When the A/D conversion terminates, an interrupt occurs to the microcomputer, and, during the A/D conversion termination interruption, converted signals are sequentially sent to the RAM 13.

Here, the cycle $\tau$ of this A/D conversion has been specified in advance so that its inverse can be a frequency twice or more times as high as the highest of the frequencies to be analysed.

The low pass filter 122 provides sufficient damping for the frequency fcut which is higher than $1/(2\tau)$.

When the number of data resulting from the A/D conversion amounts to, for instance $2^n$ at the time to, shown in FIG. 13(f), the A/D conversion termination interrupt ends. At this time to a frequency analysis flag comes ON and frequency analysis starts.

The frequency analysis is performed by taking sampling data (block A) from RAM 24 and conducting highspeed Fourier transformation 125 and butterfly calculation (for this method, see text book "FFT Katsuyo Manyuaru," by Kito, Nippon Noritsu Kyokai, Oct. 30, 1985) to obtain data B totalling $2^n$ representative of amplitude of the different sampling frequencies each from sampling data A totalling $2^n$.

Then, from these $2^n$ frequencies, spectrum portions So to Sk corresponding to frequencies $f_o$ to $f_k$ totalling k (k>1), which are predetermined by experimentation, are obtained as data $S_o$ to $S_k$ in block C. The data C are tone quality indexes in accordance with knock.

The spectrum portions $S_o$ to $S_k$ are multiplied by weighting quantities $W_l$ to $W_k$ in block 126 so as to obtain the knocking signal strength I.

At comparator 127, the signal strength I is compared with a reference strength $I_0$ which is a strength wt the time that no knock occurs, and, when the former is greater than the latter, it is decided that knock has occurred.

When this decision is made, a knock occurrence flag is set as shown in FIG. 13(g), and ignition timing is delayed by a predetermined angle $\theta$ref (FIG. 13(h)), and then the timing is gradually recovered by, for example, +1° steps after a specified interval Tadv, as in the known method of ignition timing control.

Now, a microcomputer processing needed for the above operation will be described with reference to FIGS. 14(a) to (e).

Figure 14A:
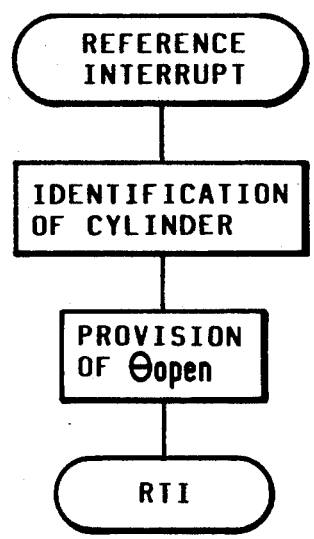
FIGS. 14(a)–(e) show flowcharts of knock detection procedures in the embodiment of FIG. 10.
Figure 14B:
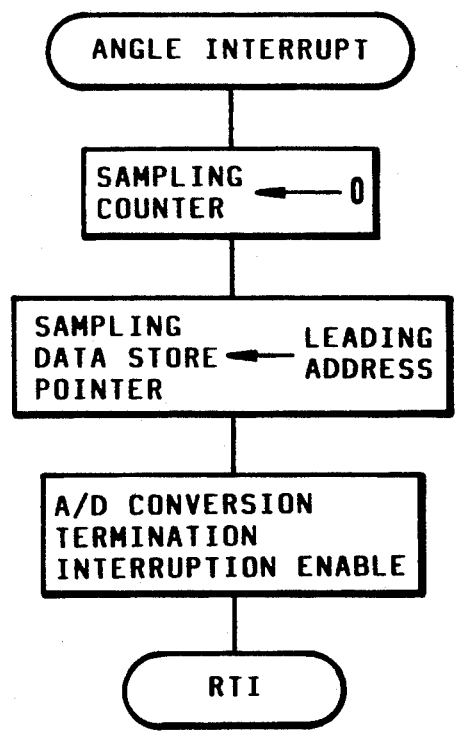

Firstly, the process shown in FIG. 14(a) is performed in response to the leading edge of the reference signal to identify a cylinder, and predetermined angle $\theta$open is provided.

During the above process, when the angle $\theta$open is found by counting position signals, an angle interrupt is caused so as to start the process shown in FIG. (14b). During the angle interrupt, the CPU is enabled for an A/D conversion termination interruption, and a sampling counter is initialized to all zeros with a sampling data store pointer being set to the leading address in the store area.

Figure 14C:
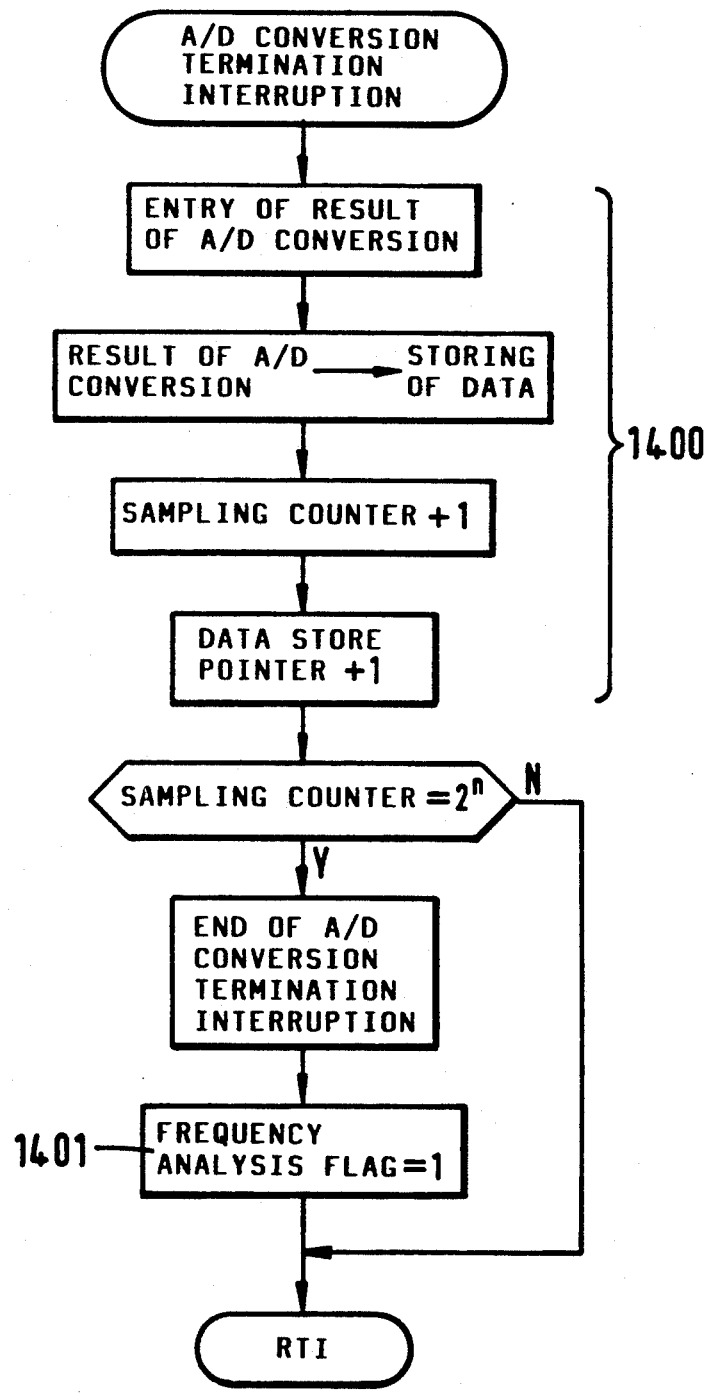

This A/D conversion termination interruption starts the process shown in FIG. 14(c). During this process, the result of the A/D conversion is entered into the address pointed to by the sampling data store pointer to increment the pointer and the sampling counter (at steps 1400). When the sampling counter reaches $2^n$, the A/D conversion termination interruption ends, and a frequency analysis flag comes ON (at step 1401).

Figure 14D:
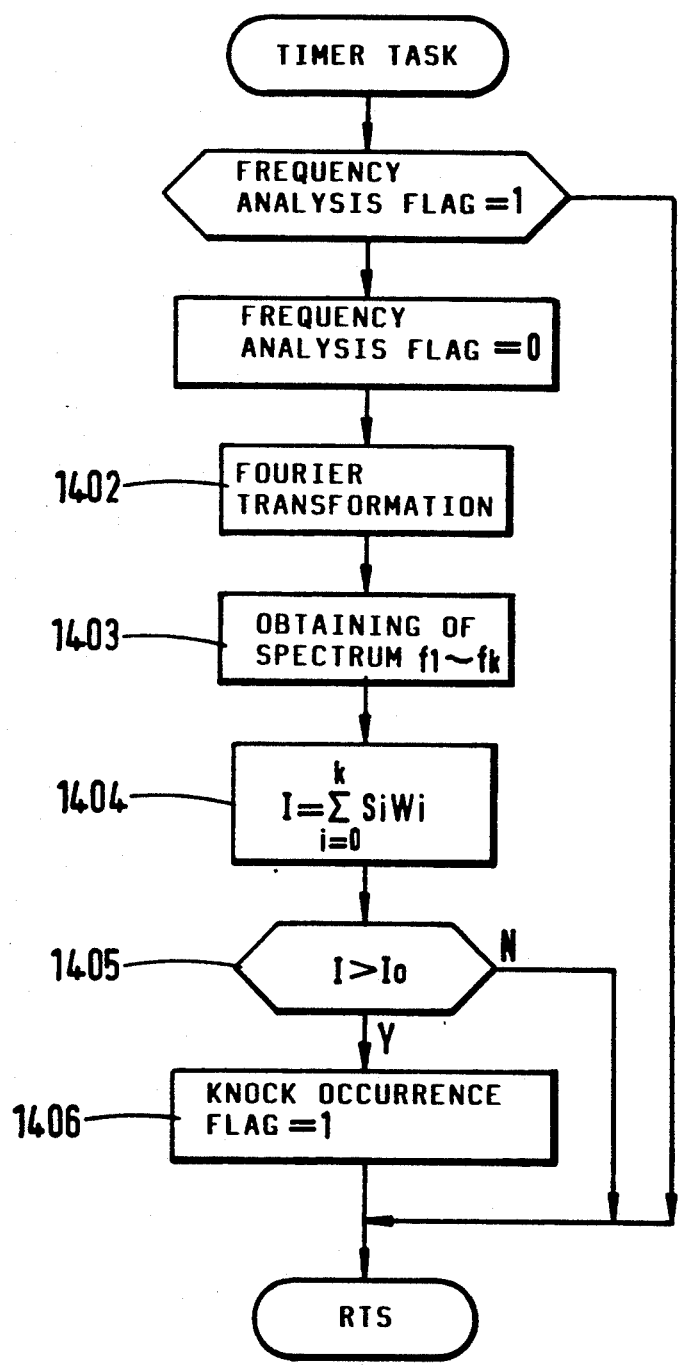

On the other hand, the process shown in FIG. 14(d) is provided as a timer task activated in a predetermined cycle. During this process, a frequency analysis flag is checked, and, when a frequency analysis flag comes ON, a high-speed Fourier transformation subroutine is activated (at step 1402).

After the high-speed Fourier transformation is completed, the process at step 1403 is performed for obtaining spectrum portions $S_l$ to $S_k$ corresponding to frequencies $f_l$ to $f_k$.

Now, frequencies particular to the occurrence of knock change slightly because of the number of engine revolutions and the timing of ignition and also vary with other factors such as the position of the piston on the occurrence of knock, so with the value of the spectrum portions $S_l$ to $S_k$ as they are it is impossible to accurately decide the occurrence of knock.

Figure 15:
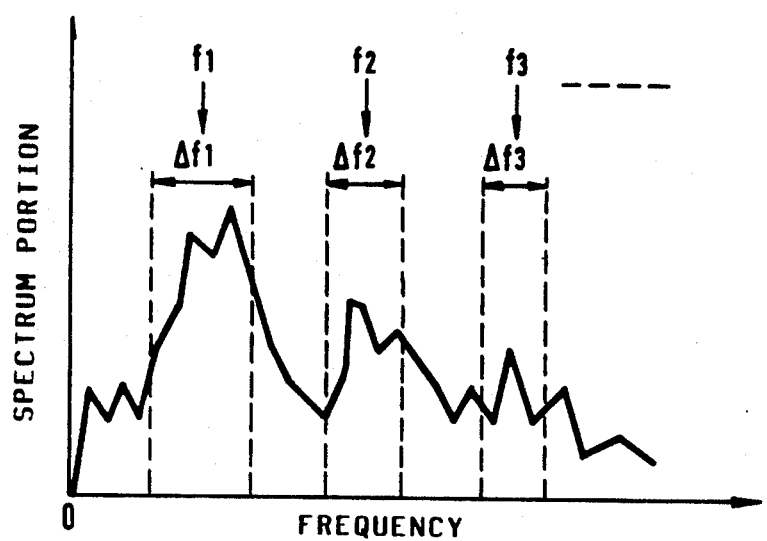
FIG. 15 shows a graphical representation of the frequency characteristics used for knock detection.

In this embodiment, therefore, as shown in FIG. 15 peaks are obtained among the spectrum portions within the range corresponding to $\Delta f_l$ to $\Delta f_k$ around the particular frequencies made up of the frequencies $f_l$ to $f_k$, and the peaks are used instead of the particular frequencies made up of the frequencies $f_l$ to $f_k$.

Note that the average of the samples within each spectrum portion within the range corresponding to $\Delta f$ around the particular frequencies may alternatively be used.

Also note that the peak frequency within a spectrum portion $\Delta f$ may be used as the central frequency for the next ignition operation.

The spectrum portions $S_l$ to $S_k$ obtained in the above-mentioned way are multiplied by weighting coefficients $W_l$ to $W_k$ which decrease when the S/N ratio increases in order to obtain the knocking intensity I (at step 1404), and this intensity I is compared with the reference intensity $I_o$ at step 1405.

When the knocking intensity is greater than the reference intensity, a knock occurrence flag comes ON (step 1406).

Figure 14E:
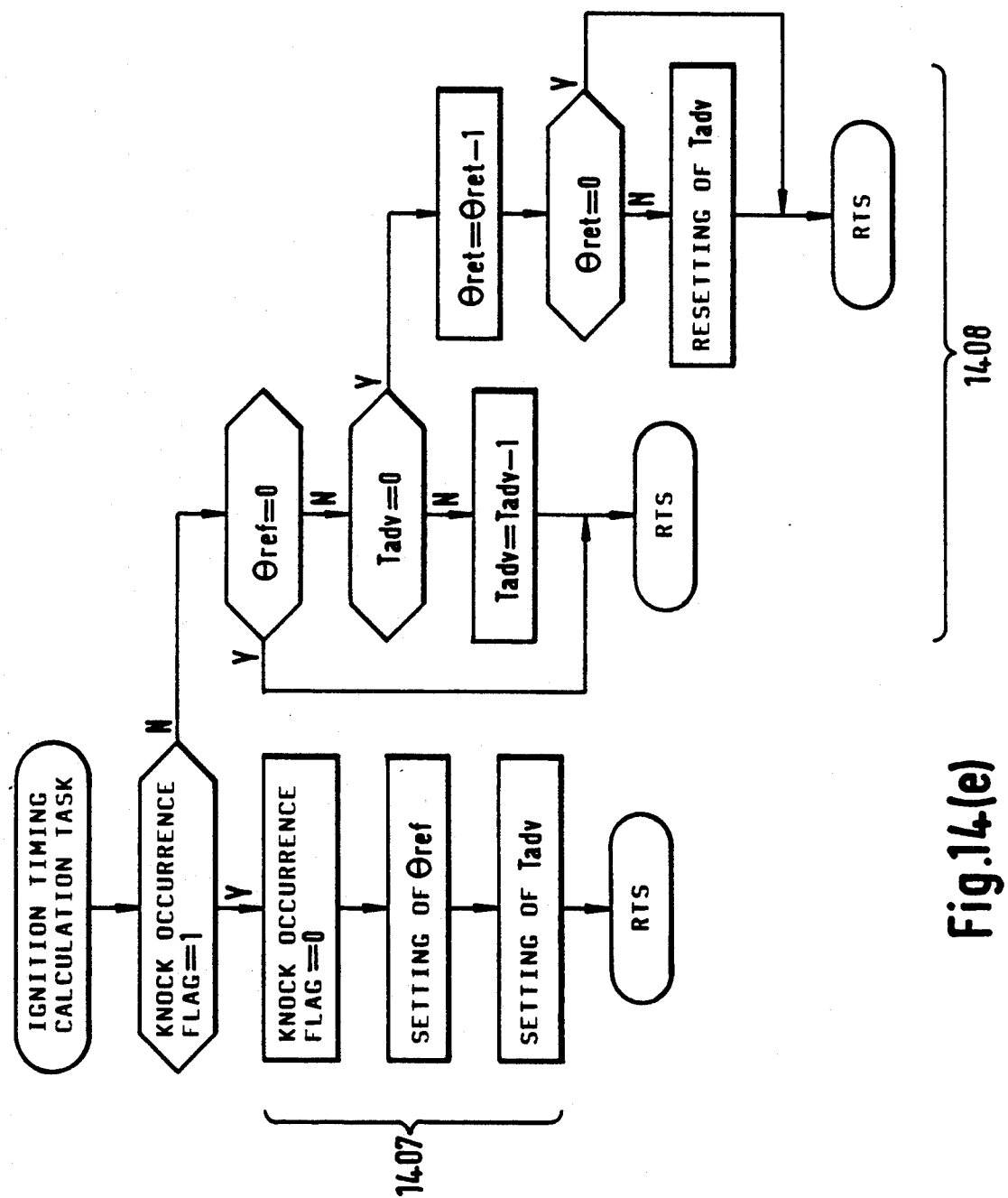

FIG. 14(e) illustrates the calculation for ignition timing. When a knock occurrence flag comes ON as described above, ignition timing is delayed by the angle $\theta ref$, and an ignition timing retention timer is set to the interval Tadv (step 1407).

The interval Tadv is subtracted from each time the cycle for the timer task is completed. When the interval Tadv reaches zero, the angle $\theta ref$ is subtracted from once. Unless the angle $\theta ref$ becomes zero as a result, the interval Tadv is set again. In the course of this operation, ignition timing is delayed every time knock occurs with the result that knock control can be implemented (step 1408).

Figure 16:
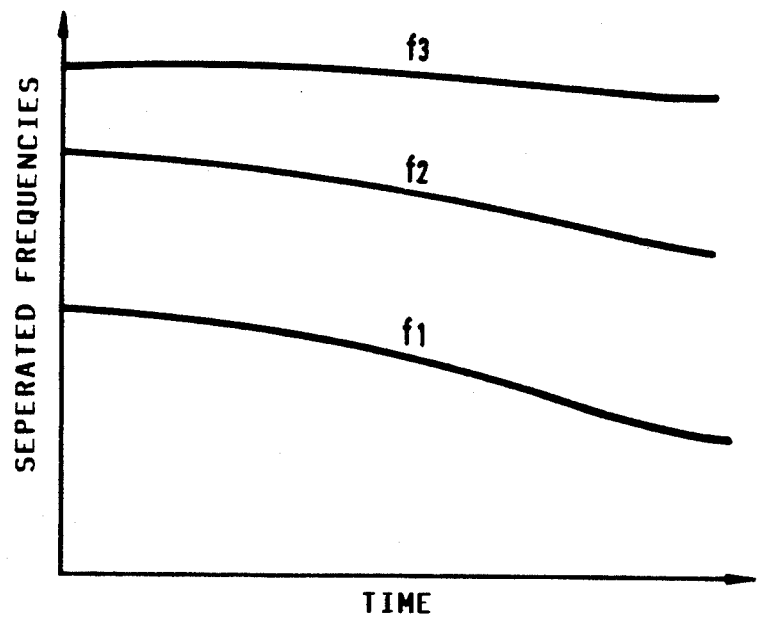
FIG. 16 shows a graphical representation of the change of frequencies for knock detection when subjected to aged deterioration of the engine.

Now, the particular frequencies $f_l$ to $f_k$ for the detection of knock are, as shown in FIG. 16, subject to the aged deterioration of the engine.

In view of this fact, as described with reference to FIG. 10, this embodiment has therein the timer 102 and speed sensor 121 to obtain the total operating time of the engine and the total distance that the automobile has covered. By virtue of the built-in battery 107, the total operating time and the total distance covered are retained even when the engine control unit 9 has the power thereto cut off.

By measuring the total operating time and total distance, the particular frequencies $f_l$ to $f_k$ for the detection of knock are modified in such a way as to compensate for such an aged deterioration which has the characteristics shown in FIG. 16 thereby determining the detection of knock with higher precision.

Although in this embodiment, again high-speed Fourier transformation has been used to analyse frequencies, another frequency analysis method such as WHT transformation known per se may alternatively be employed. The WHT transformation allows obtaining the particular frequencies $f_l$ to $f_k$ without using $2^n$ spectra and thus shortening calculation time.

Yet another frequency analysis may be used, for instance, a method of using a digital bandpass filter for predetermined frequencies $f_l$ to $f_k$ and thereby slightly altering each coefficient in Z transform to alter the central frequency in the bandpass width.

As will now be evident from the above, in the present invention the range of crank angles in which a signal is picked up is changed in accordance with the frequency to be detected so that the occurrence and non-occurrence of knocking can be judged in a range of crank angles in which a vibration component of the frequency in use appears most characteristically. Accordingly, the window in which knock detection is effected is adjustable in position and length so the knocking detecting accuracy can be improved, and the utilisation of these techniques enables the ignition timing to be more accurately controlled in dependence upon the occurrence of knocking. Therefore, the engine output power and fuel consumption can be improved.

The central frequency on the occurrence of knock also changes with the temperature of the cooling water, the temperature and humidity of intake air and operating conditions. Therefore, altering the central frequency in dependence upon these conditions allows knock detecting with yet higher precision.

By the present invention, the occurrence of knock can always be decided with high precision by checking frequencies particular to the occurrence of knock in harmony with the operating conditions of the engine so as to achieve accurate knock control.

In addition, selection of more than one frequency allows using appropriate frequencies to detect knock even when the engine operates with high load and at high speed. Also the difference in the proportion of the knocking intensity I to the reference intensity $I_o$ is large enough between the state of having knock occur and the state of having no knock, which leads to accurate decision about the occurrence of knock.

Furthermore, since knock control is operable even when the engine operates with high load and at high speed, the operating point for the engine can be brought closer to the ignition time required for the MBT control, leading to increase in engine output and decrease in fuel consumption rate.

It is to be understood that the invention has been described with reference to exemplary embodiments, and modifications may be made without departing from the spirit and scope of the invention as defined in the appended claims.

We claim:

1. A method of detecting knocking in an internal combustion engine having a crankshaft and a knock detecting sensor including the steps of determining in terms of first and second angles of crankshaft angle at least one spectrum of frequencies where engine vibration occurs due to knocking, detecting engine vibration signals caused by knocking with said knock detecting sensor between said first and second angles of said crankshaft, actively independently varying at least one of the first and second angles to track said vibration spectrum of frequencies to be evaluated, and calculating the knock intensity by determining if the level of said detected vibration signals exceed a predetermined level for use in controlling engine ignition timing.

2. A method as claimed in claim 1 wherein a plurality of frequency spectra each having a different first and second moments of time are separately analysed for determining knock intensity.

3. A method as claimed in claim 1 wherein said plurality of frequency spectra each have different centre frequencies and said crank angles are varied to maintain the centre frequencies within the first and second angles.

4. A method as claimed in claim 3 wherein the first crank angle is variable and the difference between the first and second crank angles is predeterminedly fixed.

5. A method as claimed in claims 3 wherein the crank angle range between the first and second crank angles is limited to reduce the effect of vibration caused by mechanical noise, such as by reciprocating engine inlet and exhaust valves.

6. A method as claimed in claim 3 wherein when the intensity of knocking exceeds said predetermined level then ignition timing of said engine is retarded.

7. A method as claimed in claim 1 wherein the spectrum of frequencies is detected at a plurality of sampling points within said spectrum wherein the samples at said sampling points are analysed.

8. A method as claimed in claim 7 wherein said analysis is Fast Fourier Transform or Walsh to Fourier Transform analysis known per se.

9. A method as claimed in claim 1 wherein said first and second angles are varied in dependence upon engine r.p.m., engine water temperature, intake air temperature, intake air humidity or engine mileage.

10. A method as claimed in claim 3 wherein said spectra of frequencies is each representative of a mode of vibration within a respective cylinder of said engine.

11. A method as claimed in claim 7 wherein for each frequency spectrum, the frequency of maximum amplitude is detected by analysing data at two or more consecutive frequency samples.

12. A method as claimed in claim 11 wherein said frequency of maximum amplitude is multiplied by a weighting factor and the weighted frequency of maximum amplitude for each mode are summed to provide a tone index whereby knock is detected by comparing said tone index with a predetermined signal.

13. A method as claimed in claim 11 wherein if said frequency of maximum amplitude is not centrally located within said frequency spectrum the first and second crank angles are shifted in a next cycle to centralise said frequency of maximum amplitude.

14. An apparatus for detecting knock in an internal combustion engine comprising a crankshaft angular position detector, a knock detecting sensor for detecting engine vibration caused by knocking, a timing means connected to said position detector and said knock detecting sensor for evaluating signals from said knock detecting sensor between a first and a second crankshaft angular position, and means for actively independently varying at least one of the first and second angles to track a vibration spectrum of frequencies detected by said knock detecting sensor whereby said spectrum of frequencies is maintained between said first and second crankshaft angular positions.

15. An apparatus as claimed in claim 14 further including means for evaluating said vibration spectrum of frequencies detected and means for comparing an output of said evaluating means with a means producing a predetermined signal level, and means for varying the ignition timing of said engine signal if the output of the evaluating means exceeds said predetermined signal level.

16. A method of detecting knocking in an internal combustion engine having a crankshaft and a knock detecting sensor, said method comprising the steps of:
predetermining a plurality of crank angles at which evaluation of output signals from said knock detecting sensor is started and a plurality of ranges of crank angel in which said evaluation of output signals is carried out for respective ones of a plurality of different predetermined detection frequencies;
varying said plurality of different predetermined detection frequencies to thereby change said crank angle and said crank angle range in dependence upon a vibration spectrum of said plurality of different predetermined frequencies so that said crank angle range in which said vibration spectrum is more than a predetermined level is relatively narrow;
setting, in an engine control unit, one of said plurality of crank angles and one of said plurality of crank angle ranges which is relatively narrow, respectively, and
detecting engine vibration caused by knocking with said knock detecting sensor in said set crank angle range from said set crank angle.

17. A method of detecting knocking in an internal combustion engine according to claim 16, wherein said set crank angle and said set crank angle range are limited to reduce noise vibrations.

18. A method of detecting knocking in an internal combustion engine according to claim 16, wherein said detection frequencies are changed according to the number of revolutions of the engine and said set crank angle and said set crank angle range are changed according to the varied detection frequencies.

19. A method of detecting knock in an internal combustion engine having a crankshaft and a knock detector sensor, including the steps of
predeterminedly locating a plurality of frequency spectra where knocking is expected,
converting each said location to an angle of rotation of said crankshaft to thereby define windows of said crank angular rotation where said spectra are expected,
detecting knock signals with said sensor,
determining the detected knock signals above a predetermined amplitude,
actively shifting the start of each said window in dependence upon the knock signals above said predetermined amplitude to maintain the detected knock signals above said predetermined amplitude within said window, and
evaluating the intensity of knocking from said spectra of knock signals for providing a control signal to change an ignition timing of said engine.

20. A method as claimed in claim 19 wherein said window may be altered in length to reduce the effect of vibration caused by mechanical noise such as reciprocating engine inlet and exhaust valves.

21. A method as claimed in claim 19 wherein each said window is altered in at least one of position and length to maintain the maximum frequency associated with said window approximately centrally in said window.

22. An apparatus for detecting knock in an internal combustion engine comprising a crankshaft angular position detector, a knock detecting sensor for detecting engine vibration caused by knocking, timing means connected to said position detector and said knock detecting sensor for evaluating signals from said knock detecting sensor above a predetermined level between a first and a second crankshaft angular position, means for actively varying at least one of the first and second angles of crankshaft to track a vibration spectrum of frequencies detected by said knock detecting sensor to be above said predetermined level, means for maintaining a maximum frequency within said spectrum of frequencies within said first and second crankshaft angular positions, and means for varying the ignition timing of said engine in dependence upon the knocking signals being above said predetermined level.

23. An apparatus as claimed in claim 22 wherein a plurality of timing means are provided for evaluating signals from said knock detecting sensor each between respective first and second crankshaft angular positions, said crankshaft angular positions being representative of frequency spectra where knocking is expected.

24. An apparatus as claimed in claim 22 wherein said maintaining means maintains said maximum frequency approximately centrally between said crankshaft first and second angular positions.

* * * * *